US012681616B2

(12) United States Patent (10) Patent No.: US 12,681,616 B2

Deif (45) **Date of Patent: *Jul. 14, 2026**

(54) USER INTERFACE WITH MULTIPLE ELECTRONIC LAYERS WITHIN A THREE-DIMENSIONAL SPACE

(71) Applicant: Abu Dhabi University, Abu Dhabi (AE)

(72) Inventor: Hatem Mohamed Deif, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 292 days.

This patent is subject to a terminal disclaimer.

(21) Appl. No.: 18/419,120

(22) Filed: Jan. 22, 2024

(65) Prior Publication Data

US 2024/0241613 A1 Jul. 18, 2024

Related U.S. Application Data

(63) Continuation of application No. 17/600,100, filed as application No. PCT/IB2020/053679 on Apr. 17, 2020, now Pat. No. 11,880,537.

(60) Provisional application No. 63/008,182, filed on Apr. 10, 2020, provisional application No. 62/836,617, filed on Apr. 20, 2019, provisional application No. 62/884,176, filed on Aug. 8, 2019.

(51) Int. Cl.
  *G06F 3/0481* (2022.01)
  *G06F 3/0482* (2013.01)

(52) U.S. Cl.
  CPC .......... *G06F 3/0481* (2013.01); *G06F 3/0482* (2013.01); *G06F 2203/04803* (2013.01)

(58) Field of Classification Search
  CPC ................. G06F 3/0481; G06F 3/0482; G06F 2203/04803; G06F 40/106; G06F 40/131; G06F 40/137; G06F 40/14; G06F 40/166; G06F 40/169
  See application file for complete search history.

(56) References Cited

U.S. PATENT DOCUMENTS

| | | | | | |
|---|---|---|---|---|---|
| 6,075,530 A | * | 6/2000 | Lucas | ................... | G06F 16/287 |
| | | | | | 715/804 |
| 6,222,559 B1 | * | 4/2001 | Asano | ................... | G06T 11/206 |
| | | | | | 345/629 |

(Continued)

OTHER PUBLICATIONS

Knutsson, Frederic, Office Action Rejection, P79101EP-202.09.25-20796298, Sep. 25, 2025, pp. 1-36, European Patent Office, Munich, Germany.

*Primary Examiner* — Asher D Kells

(57) ABSTRACT

A device including a memory and a processor. The processor receives electronic information. The processor analyzes the electronic information. The processor displays, based on analyzing the electronic information, the electronic information on a graphical user interface. The displayed electronic information is shown as a first electronic formation, and the graphical user interface is controlled by the processor. The device receives an electronic communication and changes the displayed electronic information to a second electronic formation displayed on the graphical user interface. The change from the first electronic formation to the second electronic formation occurs instantaneously.

15 Claims, 26 Drawing Sheets

(56) References Cited

U.S. PATENT DOCUMENTS

| | | | | |
|---|---|---|---|---|
| 6,888,554 B1* | 5/2005 | Decombe | G06F 16/9024 | |
| | | | 707/E17.011 | |
| 7,290,223 B2* | 10/2007 | Decombe | G06F 3/0482 | |
| | | | 715/810 | |
| 8,161,413 B2* | 4/2012 | Chen | G06F 16/954 | |
| | | | 715/764 | |
| 11,287,946 B2* | 3/2022 | Jackson | G06F 3/0482 | |
| 2002/0069215 A1* | 6/2002 | Orbanes | G06F 3/0481 | |
| | | | 715/233 | |
| 2002/0080177 A1* | 6/2002 | Orbanes | G06F 3/04815 | |
| | | | 715/765 | |
| 2002/0107893 A1* | 8/2002 | Ohkouchi | G06F 16/9027 | |
| | | | 715/276 | |
| 2002/0113816 A1* | 8/2002 | Mitchell | H04L 41/044 | |
| | | | 715/734 | |
| 2003/0037316 A1* | 2/2003 | Kodosky | G06F 3/04817 | |
| | | | 717/127 | |
| 2004/0189717 A1* | 9/2004 | Conally | G06F 3/0481 | |
| | | | 715/853 | |
| 2004/0230917 A1* | 11/2004 | Bales | G06F 3/0481 | |
| | | | 715/854 | |
| 2006/0085434 A1* | 4/2006 | Mah | G06F 16/958 | |
| 2007/0192739 A1* | 8/2007 | Hunleth | G06F 3/0481 | |
| | | | 725/39 | |
| 2011/0055771 A1* | 3/2011 | Chen | G06F 16/954 | |
| | | | 715/854 | |
| 2012/0023453 A1* | 1/2012 | Wagner | G06F 3/04886 | |
| | | | 715/848 | |
| 2012/0233573 A1 | 9/2012 | Sullivan et al. | | |
| 2013/0151974 A1* | 6/2013 | Cho | G06F 40/137 | |
| | | | 715/799 | |
| 2015/0379476 A1* | 12/2015 | Chaudhri | G06F 1/163 | |
| | | | 705/7.18 | |
| 2016/0062573 A1* | 3/2016 | Dascola | G06F 3/0488 | |
| | | | 715/810 | |
| 2018/0113589 A1* | 4/2018 | Hunleth | G06F 3/0484 | |
| 2019/0213763 A1* | 7/2019 | Geller | G06F 16/9024 | |

* cited by examiner

800

| AREAS | INFO 1 802 | INFO 2 804 | INFO 3 806 | INFO 4 808 |
|---|---|---|---|---|
| INFO 1 810 | | X | X | |
| INFO 2 812 | | | | |
| INFO 3 814 | | | | X |
| INFO 4 816 | ● | ● | ● | ● |

FIG. 8

USER INTERFACE WITH MULTIPLE ELECTRONIC LAYERS WITHIN A THREE-DIMENSIONAL SPACE

BACKGROUND

A user interface may provide for a user to electronically interact with software by making one or more selections via the user interface. User interfaces, such as graphical user interfaces, may provide for information to be displayed in one or more areas. There is currently no system that provides for an effective way to select information related to displayed information on a user interface.

BRIEF DESCRIPTION OF DRAWINGS

FIG. 8 is an example database structure for information associated with communication features;

DETAILED DESCRIPTION OF PREFERRED EMBODIMENTS

Figure 1A:
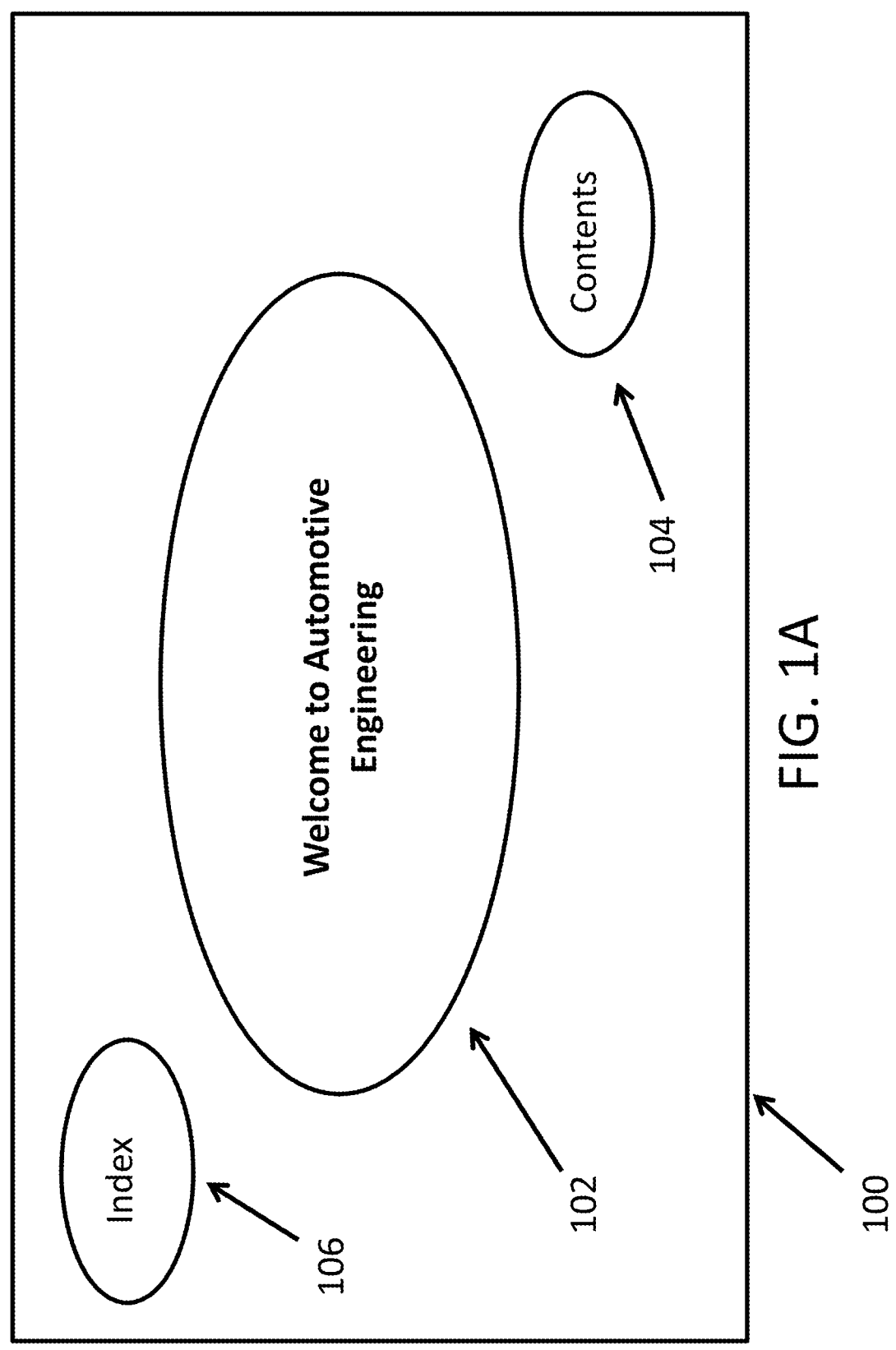
FIGS. 1A-1C are diagrams of an example environment in which systems and/or methods described herein may be implemented.

The following detailed description refers to the accompanying drawings. The same reference numbers in different drawings may identify the same or similar elements.

Systems, devices, and/or methods described herein may allow for a user, using a computing device (e.g., smartphone, laptop, etc.) to interact with electronic information via a user interface (e.g., a graphical user interface). In embodiments, an electronic application may display a first area of information (e.g., a node of information) which when selected generates one or more communications that display a second area of electronic information on the user interface. Along with the second area of electronic information, additional areas of electronic information are displayed in their own distinct areas alongside the second area of electronic information. In embodiments, when one of the additional areas of electronic information is selected, the selected area of electronic information expands in size on the user interface display while the second area of electronic area of information is no longer displayed. In embodiments, related information associated with the selected area of electronic information is now displayed on the user interface display.

Accordingly, the one more or more systems, methods, and/or devices described herein allow for (1) generating electronic information in an area (e.g., a parent area) on a user interface display (e.g., computer screen, smartphone screen, etc.), (2) additional areas (e.g., child areas) of electronic information to be displayed in their dedicated areas on the user interface display, which are related to the parent area, and displayed along with the parent area (3) selecting one of the additional areas which results in a zooming feature which increases the size of the selected additional area while removing the parent area from display, and (4) and generating the additional area along with its own child nodes that are displayed on the user interface display.

Thus, each area is associated with a node that can be a parent node when associated with some areas and/or be a child node when associated with other areas. Thus, child nodes may have their own child nodes which create a hierarchical relationship which may only be limited by the number of child nodes and related areas of information associated with the user interface. Thus, parent and child nodes represent topics and related subtopics in a hierarchical tree structure with each node relating to a document. Accordingly, each document includes a title along with a description that includes text, images, audio, videos, hyperlinks, equations, graphic interchange format (GIF) features, and/or any other type of content that can be seen, read, and/or heard.

In addition, when a particular area of information is displayed, electronic information may be edited within that particular area without having to exit the display screen and use an electronic editor on another display area. Also, a user may also select for display or hide an electronic title or description of the area (e.g., parent node, child node, etc.). Accordingly, the one or more systems, methods, and/or devices described herein reduce the amount of time needed to electronically transfer from one area of information to another area of information. Furthermore, with reduced amount of time along with the zooming features, a user interface may display greater amounts of electronic information without having to spend time to electronically select other folders or other parts of a software application and reduce computer processing time and resources.

In embodiments, the user interface may be associated with an electronic application. In embodiments, the electronic application may electronically communicate with one or more other computing devices. In embodiments, the other computing devices may be part of the same electronic network as the electronic device or may be part of another electronic network. In embodiments, the other computing devices may electronically communicate with the electronic device via a local wireless or wired electronic connection. In embodiments, the one or more other computing devices may store electronic information in one or more databases. In embodiments, the electronic device may retrieve previous original or converted documents from an electronic cloud computing system.

Thus, the system is made up of nodes that represent various topics of a document. These nodes are structured in a tree relationship where each node can have one or more children nodes. Each node has a title and description with the description having text, images, videos, questions, question banks, and/or other types of interactive components. Furthermore, the system provides for zooming and panning features, editing features, printing features, and exporting to other electronic application features. With each displayed area of information (which is associated with a particular node), text, images, videos, and other interactive features can be displayed based on the construction of the related node features. Accordingly, by using the systems, methods, and/or processes described in the following figures, multiple areas of electronic information that can be displayed and/or edited by using less time and electronic communications.

Figure 1B:
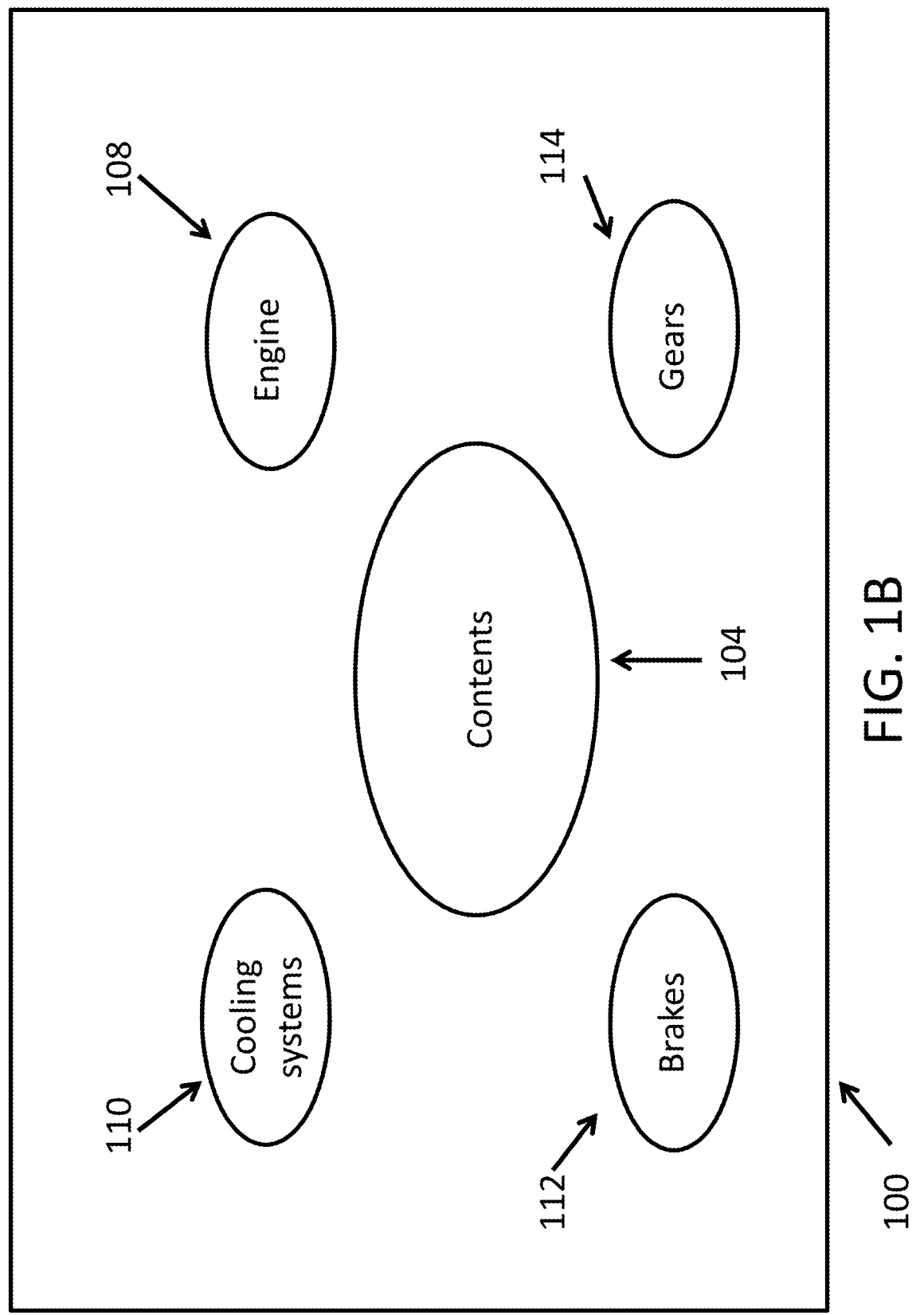
Figure 1C:
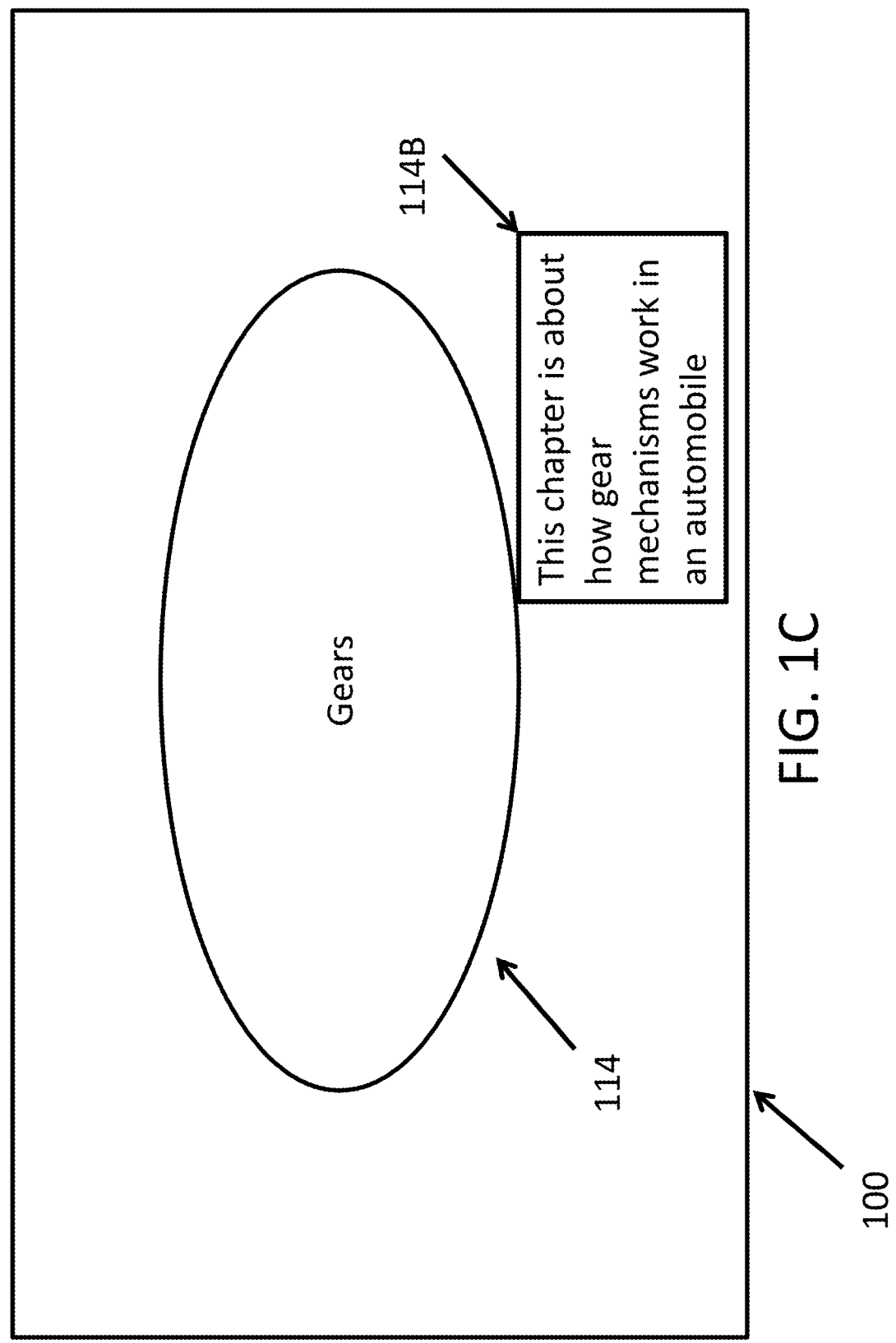

FIGS. 1A-1C describe one or more example processes for selecting information based on selecting particular areas on a user interface and obtaining additional information. FIG. 1A shows example display 100 which is associated with a computing device (e.g., a smartphone device, a laptop, etc.). As shown in FIG. 1A, display 100 includes area 102 which has a title "Introduction to Automotive Engineering." On the same screen are two additional areas, area 104 and 106. Areas of 104 and 106 are associated with child nodes and area 102 is associated with a parent node. Thus, areas 104 and 106 are child nodes of apparent node associated with area 102. A user of the computing device may select area 104 (e.g., using a keypad, a mouse, touching a screen, etc.).

Upon selecting area 104, additional areas are displayed and are shown in FIG. 1B. Furthermore, by selecting area 104, display 100 enlarges area 104 and makes it the parent node. As a result, area 102 no longer appears on display 100. In addition, with selection of area 104, areas that relate to area 104 (which is now the parent node) are also displayed. As shown in FIG. 1B, areas 108, 110, 112, and 114 are displayed which are associated with child nodes that are children of the node associated with 104. Thus, the node associated with 104 can be both a child node and a parent node depending on that node's relationship to other nodes. A user may decide to select any of the child nodes.

A user may decide to select one of the child nodes. In this example, a user decides to select area 114. Upon selecting area 114, display 100 may now have increase the size of area 114 such that the area shown in FIG. 1C is greater than that shown in FIG. 1B. Upon selecting area 114, areas 108, 110, and 112 no longer appear as selection of area 114 cause user interface 100 to zoom and enlarge the size of area 114.

A user may decide that they would like information about area 114. The user may select a particular part of area 114 or right-click to obtain information about area 114. In doing so, information box 114B appears on display 100 and includes information about the node associated with area 114. Accordingly, FIGS. 1A-1C show examples of allowing a user to spend less time and communications to obtain related information that occurs when selecting an area on a display screen which results in related information to the selected area being displayed and previous parent information from being removed from the display screen.

Figure 2:
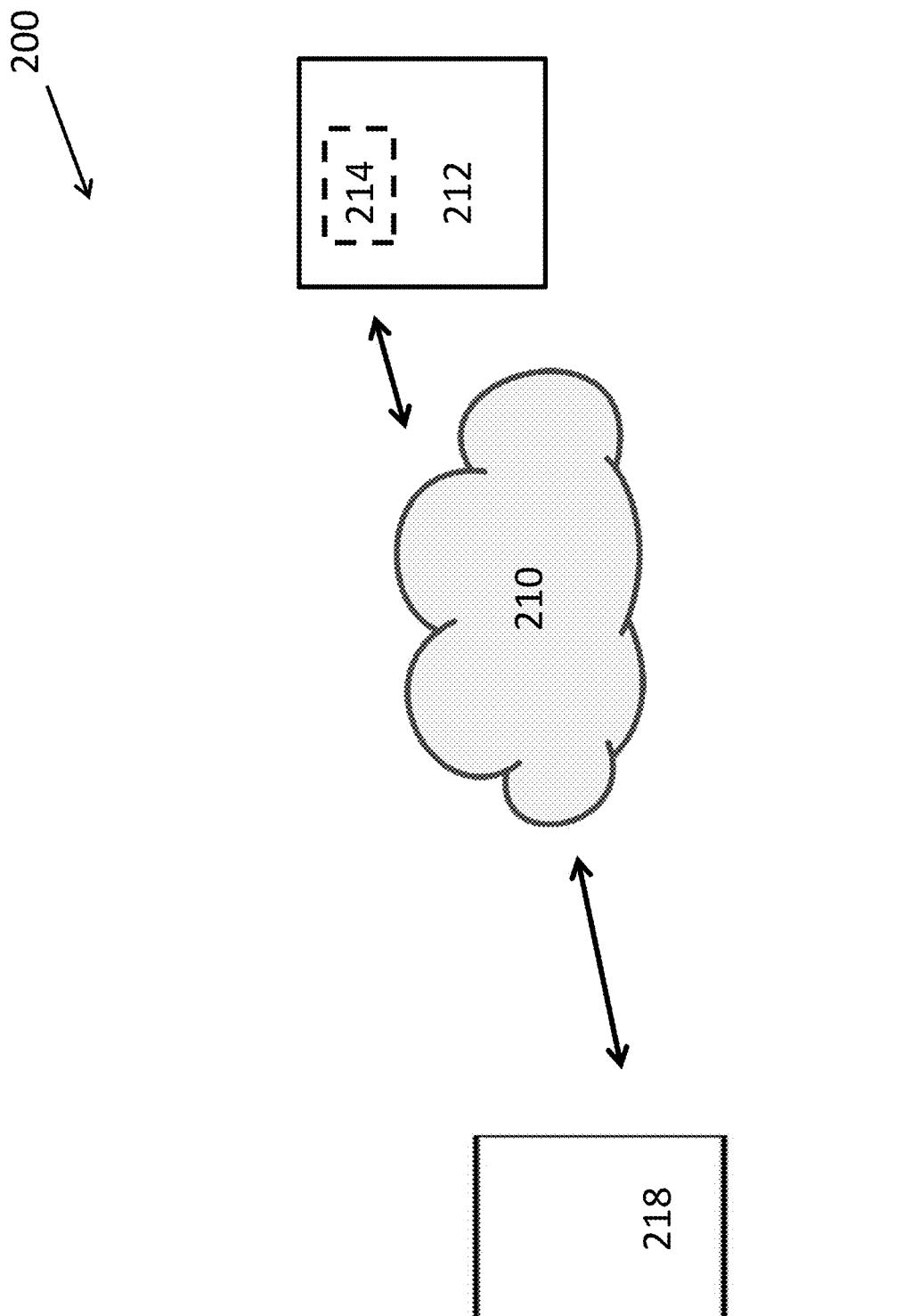
FIG. 2 is a diagram of a network environment.

FIG. 2 is a diagram of example environment 200 in which systems, devices, and/or methods described herein may be implemented. FIG. 2 shows network 210, user device 212, electronic application 214, and server 218.

Network 210 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 110 may include a cellular network, a public land mobile network (PLMN), a second generation (2G) network, a third generation (3G) network, a fourth generation (4G) network, a fifth generation (5G) network, and/or another network. In embodiments, network 210 may allow for devices describe any of the described figures to electronically communicate (e.g., using emails, electronic signals, URL links, web links, electronic bits, fiber optic signals, wireless signals, wired signals, etc.) with each other so as to send and receive various types of electronic communications.

User device 212 may include any computation or communications device that is capable of communicating with a network (e.g., network 210). For example, user device 212 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a scanning device, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

User device 212 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 212. User device 212 may have a touch screen, mouse, and/or a keyboard that allows a user to electronically interact with an electronic application. In embodiments, a user may swipe, press, or touch user device 212 in such a manner that one or more electronic actions will be initiated by user device 212 via an electronic application.

User device 212 may include a variety of devices, such as, for example, a camera, a video device, a multi-media device, a television, a personal gaming system, a set-top box, a smart phone, a laptop computer, a desktop computer, a cellular phone device, a tablet computer, a personal digital assistant (PDA), or another type of communications or computation device.

Electronic application 214 may be capable of interacting with user device 212, server 218, and/or network 210 to electronically generate hierarchical relationship between different information and generate displayed areas of information based on their hierarchical relationships. In embodiments, electronic application 214 may generate graphical and alphanumeric features based on electronic communications and transactions associated with the document with the printed and handwritten information. In embodiments, electronic application 214 may interact with other electronic applications (e.g., associated with server 218). In embodiments, electronic application 214 may interact with application programming interfaces (APIs) to obtain electronic information from other electronic applications. In embodiments, electronic application 214 may be electronically configured to show photos, video, text, icons, graphical images, buttons, emojis, and/or any other electronic information. While FIG. 2 shows electronic application 214 on user device 212, electronic application 214 can also be stored, completely or partially, on user device 212, and/or server 218. Electronic application 214 may also include a conversion application, an e-mail application, a telephone application, a camera application, a video application, a multi-media application, a music player application, a visual voice mail application, a contacts application, a data organizer application, a calendar application, an instant messaging application, a texting application, a web browsing application, a blogging application, and/or other types of applications (e.g., a word processing application, a spreadsheet application, etc.).

Server 218 may include one or more computational or communication devices that gather, process, store, and/or provide information relating to one or more web pages or electronic pages that electronically display electronic content (e.g., advertisements, posts, messages, video content) associated with the one or more services.

While FIG. 2 shows electronic application 214, there may be multiple different types of electronic applications 214 that each has their own server(s) that are similar to server 218.

Figure 3:
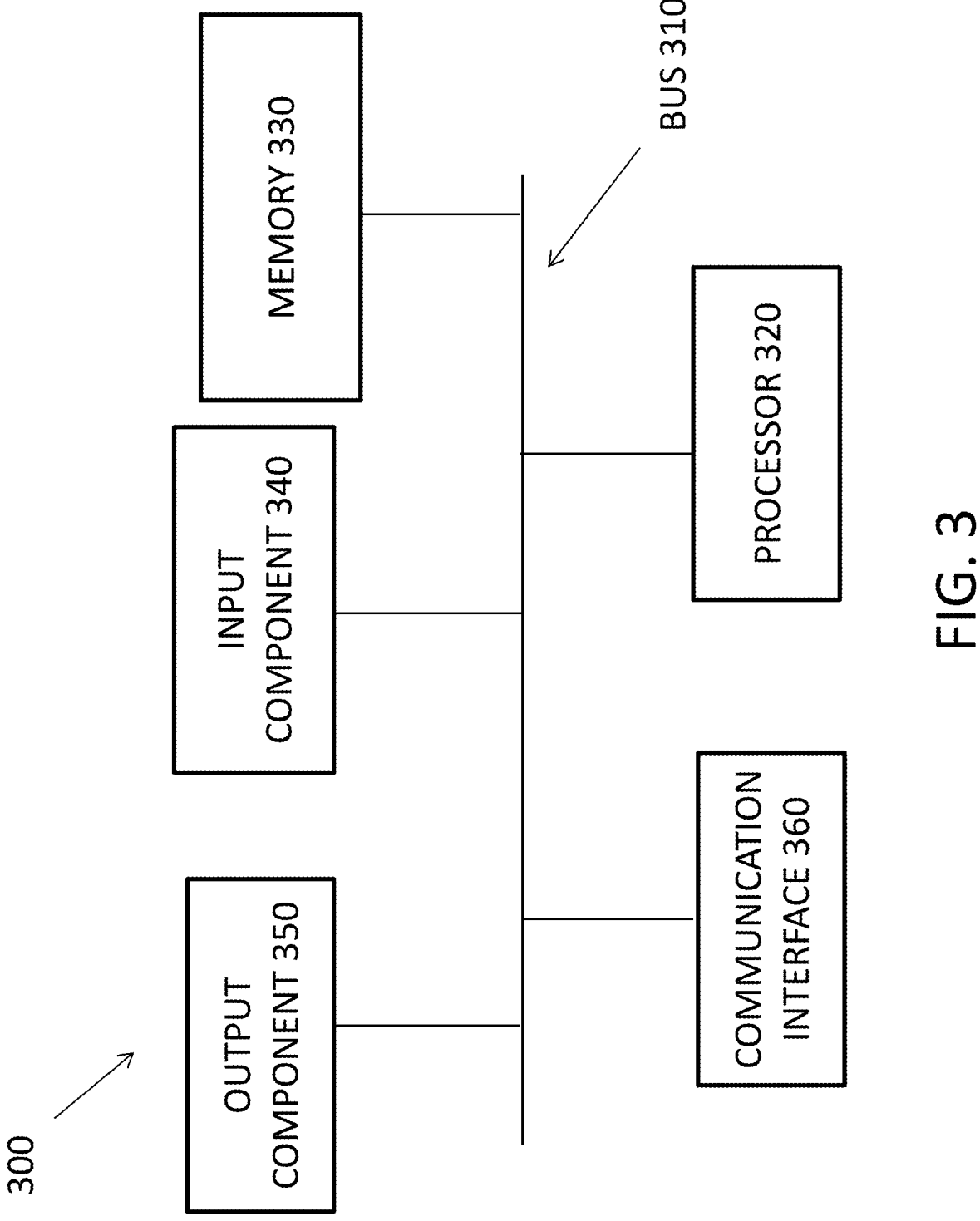
FIG. 3 is a diagram of an example computing device.

FIG. 3 is a diagram of example components of a device 300. Device 300 may correspond to user device 212 and server 218. Alternatively, or additionally, user device 212 and server 218 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like.

In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may for example, receive RF signals from communications interface 360 and transmit the RF signals over the air, and receive RF signals over the air and provide the RF signals to communications interface 360. In one implementation, for example, communications interface 360 may communicate with network 210.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
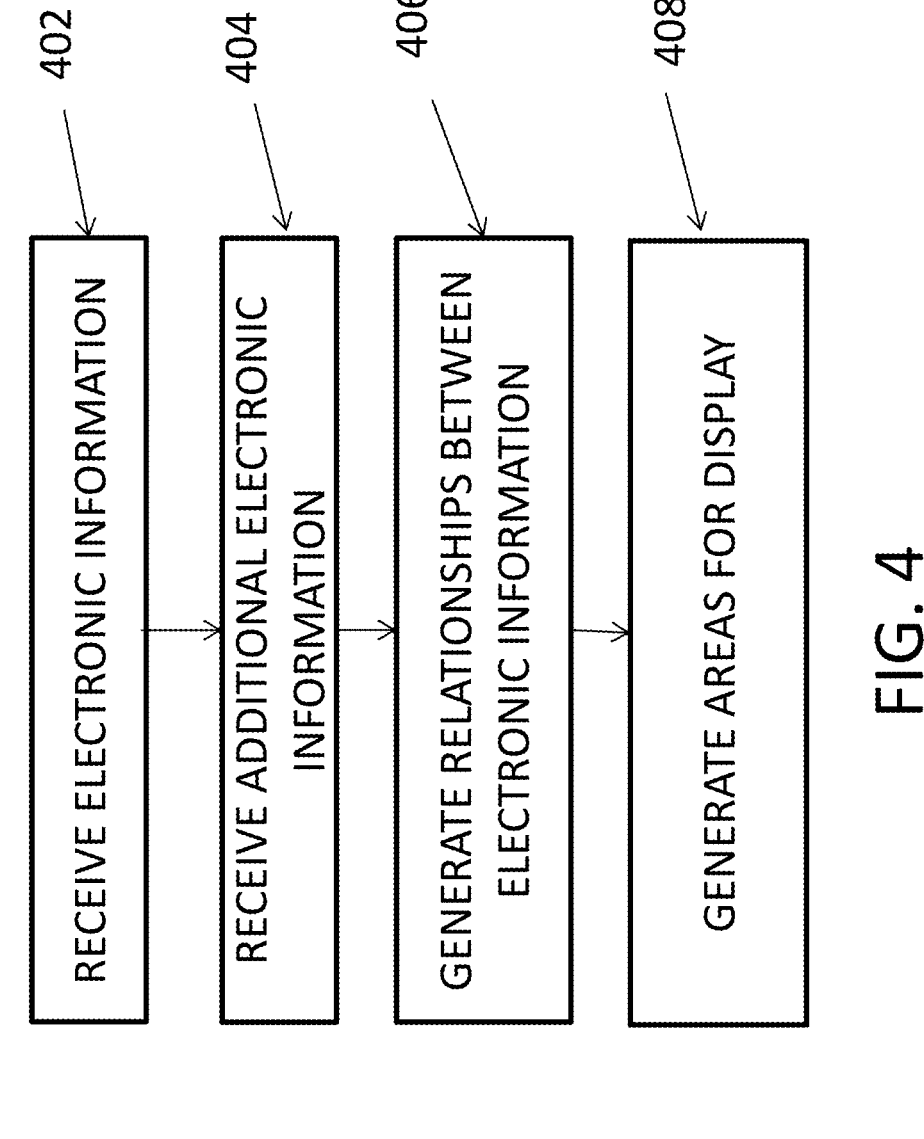
FIGS. 4, 5, 6, and 7 are flow diagrams of example processes for generating information on a user interface.

FIG. 4 is a flow chart of an example process 400 for generating a hierarchical relationship between different types of information. In embodiments, example process 400 may be performed by user device 112 and/or electronic application 214. At step 402, user device 212 and/or electronic application 214 may receive electronic information. In embodiments, the electronic information may be associated with any type of subject matter. For example, the electronic information may be a chapter in a fictional story, non-fictional information such as on an academic subject matter (e.g., history, engineering, law, etc.), autobiographical information on a famous person (e.g., a musician, actor, etc.), pictures relating to a comic book, book of photography, maps, or any other type of publication that would include pictures, and/or any other type of information. In embodiments, the electronic information may be from a webpage.

At step 404, user device 212 and/or electronic application 214 may receive additional electronic information. In embodiments, the additional electronic information may be related to the information received in step 402. At step 406, user device 212 and/or electronic application 214 may generate relationships between different electronic information. In embodiments, the relationships may be generated between one type of electronic information and one or more other types of electronic information. In embodiments, one type of electronic information may be classified as a parent node which has one or more child nodes. In embodiments, one or more child nodes may themselves be classified as parent nodes that have their own child nodes. Accordingly, a hierarchical relationship is created between different types of information.

For example, a parent node may be a chapter on air-conditioning and child nodes may be on each section of the chapter, such as individual sections on evaporators, condensers, compressors, and motors. In addition, each section may then have sub-sections. For example, the section on motors may have a subsection on electrical motor and another subsection on natural gas engines. Thus, the section on motors may be a child node in its relationship with air-conditioning and a parent node that has two child nodes of its own.

At step 408, user device 212 and/or electronic application 214 may generate areas that are displayable on an electronic display with each generated area associated with a particular type of electronic information. In embodiments, each generated area has a hierarchical relationship that is based upon the generated relationships described in step 406. In embodiments, each generated area is displayed for each node, including parent nodes and child nodes. In embodiments, each area may be generated at the same size or different sizes. In embodiments, generated areas may change in size based upon whether it is a child node or is a parent node. For example, if a child node is selected then it may become the parent node and, thus, the area may change. In embodiments, each generated area is electronically created so that when the generated area is displayed and is selected, the display screen will zoom into the area and show for display additional child nodes for the selected area. Thus, the size of the generated area can be dynamic and change in size based on its selection and/or relationship when displayed on the user interface. In embodiments, each generated area may be generated on a separate layer that when displayed together appear as one screen. Thus, each layer has no boundaries shown against another layer and the layers come together seamlessly when displayed on a user interface. In embodiments, each generated area may also include generating a spatial relationship between different areas. Thus, displayed areas associated with a child node may be all the same distance from a displayed area associated with a parent node. Alternatively, select areas may have different spatial relationships. Thus, one area of a child node may be closer to an areas associated with a parent node than another area of another child node.

Figure 5:
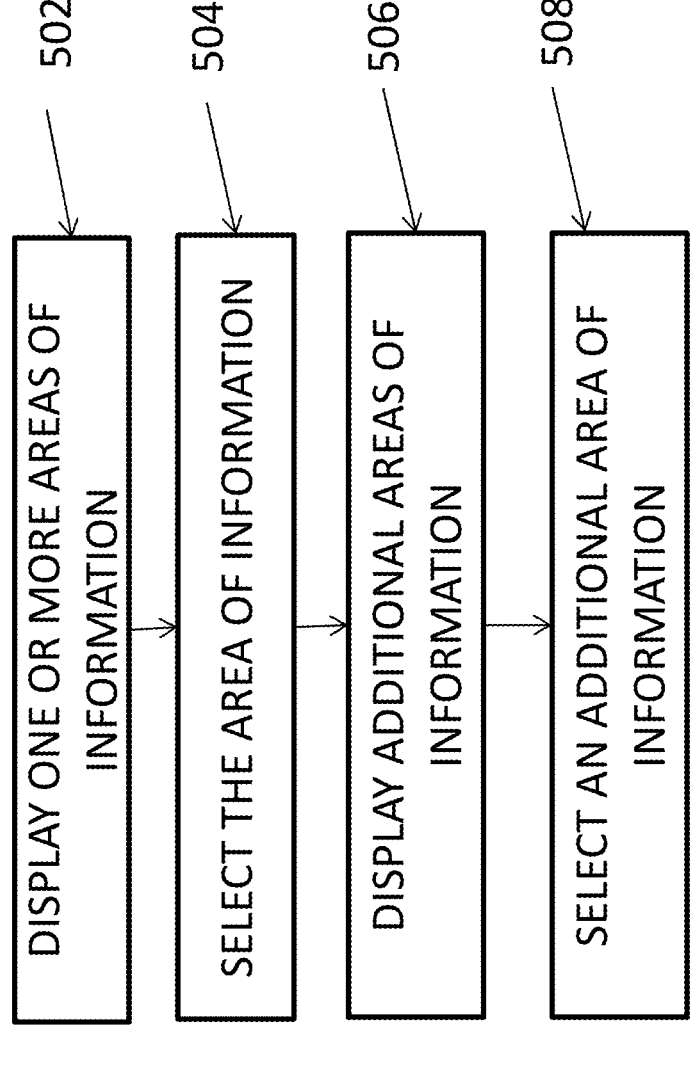

FIG. 5 is a flow chart of an example process 500 for displaying and selecting information. In embodiments, example process 500 may be performed by user device 212 and/or electronic application 214. At step 502, user device 212 and/or electronic application 214 may display one or more areas of electronic information on a display screen via a user interface (e.g., graphical user interface). In embodiments, the electronic information may be displayed within a defined area displayed on the screen. In embodiments, other areas may be displayed on the user interface and may be related to each other or are related to one particular area. In embodiments, areas may be shown that indicate the relationship between one area of information to another area of information. For example, one area may be a classified as a parent node and other areas may be classified as child nodes that relate to the parent node. There may be graphical lines that connect from the parent node to each child node.

At step 504, an area of information is selected. In embodiments, a user may select an area of information by using a keypad or mouse associated with the computing device that is being used to display the area of information. The user may also select the area of information by touching the display screen when the display screen is a touch screen. Upon selecting an area of information, that particular area of information may expand its size upon the user interface. For example, if the size of the area took up 5% of the display screen, the size may increase to 20% of the display screen. Upon selecting the area of information, the area of information increases in size and, at step 506, additional areas (or an area) of information is displayed. In embodiments, other areas of information may disappear from display. In embodiments, the additional areas of information may be child nodes that are related to the selected area of information which is the displayed parent node. At step 508, one of additional areas of information is selected. Upon selection, this area of information now becomes the parent node and its child nodes are now displayed on the user interface.

Figure 6:
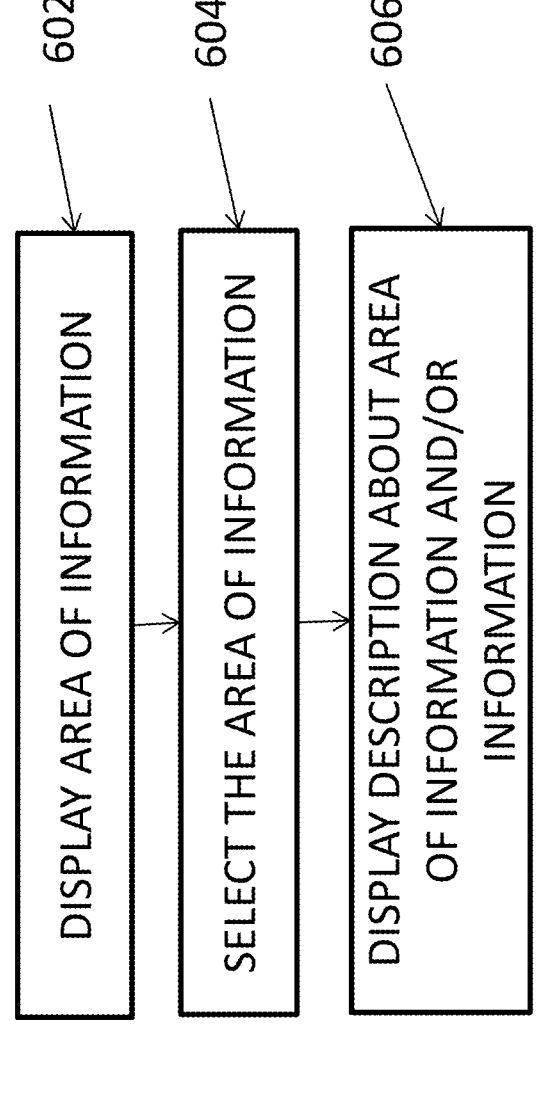

FIG. 6 is a flow chart of an example process 600 that provides for displaying title information. In embodiments, example process 600 may be performed by electronic application 214 and/or user device 212. At step 602, user device 212 and/or electronic application 214 may display one or more areas of electronic information on a display screen via a user interface (e.g., graphical user interface). In embodiments, the electronic information may be displayed within a defined area displayed on the screen. At step 604, user device 212 and/or electronic application 214 may receive a command to select an area of information. In embodiments, the selection of area of information does not result in any change to the size of the area of the information or the display of additional areas of information. At step 606, user device 212 and/or electronic application 214 may receive a command to display description information about the area of information. For example, an area of information may have a title of "History of 19$^{th}$ Century China." By receiving the command to display the description information, a pop-up box may be displayed which includes a brief or full description of the information relating to the title. For example, the pop-up box may be "This chapter is about social, economic, and foreign issues in China from 1800 to 1899." In embodiments, a user may also request display of the information (thus, a command is received to display information). In embodiments, the information may include text, audio, video, and/or other types of information. It is not necessary for the user to request description for the area prior to requesting the information. In embodiments, a user may provide feedback to the author of the information by selecting a like or dislike node that may be associated with the area of information. In embodiments, a user may also select the area of information as a "favorite node." Thus, the user may then have multiple selected "favorite" nodes which can then be used to generate a different hierarchical relationship between different areas (e.g., nodes). Thus, for example, node S1 has child nodes T1, T2, T3, and T4. Child node T1 has its own child nodes of U1, U2, U3, and U4 while child node T3 has its own child nodes of W1, W2, and W3. Each type of node is associated with different information displayed in different areas. Based on selecting different areas, a user has selected T1, U2, and W3 as their favorite information. Accordingly, user device 212 and/or electronic application 214 may generate a new hierarchical relationship that is S1 with child nodes T1, U2, and W3.

Figure 7:
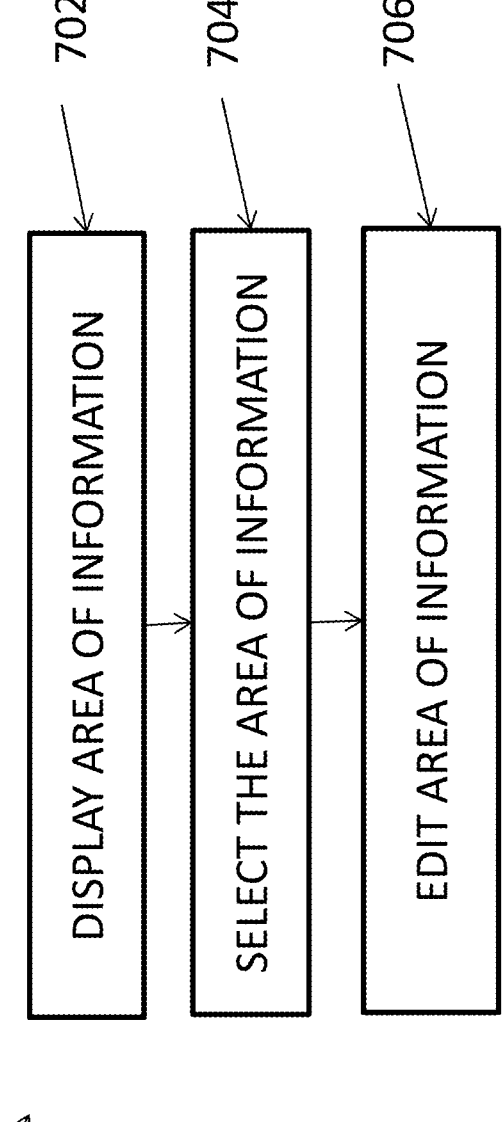

FIG. 7 is a flow chart of an example process 700 that provides for editing information In embodiments, example process 700 may be performed by electronic application 214 and/or user device 212. At step 702, user device 212 and/or electronic application 214 may display one or more areas of electronic information on a display screen via a user interface (e.g., graphical user interface). In embodiments, the electronic information may be displayed within a defined area displayed on the screen. At step 704, user device 212 and/or electronic application 214 may receive a command to select an area of information. In embodiments, the selection of area of information does not result in any change to the size of the area of the information or the display of additional areas of information. At step 706, user device 212 and/or electronic application 214 may receive a command to amend the information associated with the area of information. For example, the area of information may be titled "Mathematical Division." In embodiments, the text associated with "Mathematical Division" may appear on the screen as a pop-up screen or as information listed on the display. In embodiments, user device 212 and/or electronic application 214 may receive one or more commands to change the text. For example, a command may be to add text, delete text, add pictures, delete pictures, change node title, change node description, and/or adding or deleting any type of text, picture, map, table, equation or other feature shown in a textbook, fictional novel, or non-fictional book (e.g., travel guides, autobiography, maps, etc.).

In embodiments, information in one or more areas (related nodes) may be printed or exported to other applications and software. In embodiments, user device 212 and/or electronic application 214 may electronically analyze and select the amount of information based on electronic commands that provide parameters on time for a user to read the document and/or parameters on the number of words, images, or audio. Thus, for example, a user may wish to generate a review for a quiz with the review being associated with a particular amount of time and content. Accordingly, based on the time and/or content requirements, user device 212 and/or electronic application 214 may select one or more areas of information (e.g., nodes) and automatically generate a new hierarchical tree of information that conforms with the selected time and content requirements. Thus, the new hierarchical tree will generate areas of information that may be selected as discussed in other examples and figures. Accordingly, a new hierarchical tree may be generated along with areas generated in either the same or different relationships when displayed for selection via a user interface.

FIG. 8 describes an example data structure 800 that stores hierarchical relationships between different types of information. In embodiments, data structure 800 may include a collection of fields such as 802 to 816. Although FIG. 8 shows example fields 802-816, in other embodiments, data structure 800 may include fewer fields, different fields, additional fields, and/or differently arranged fields than depicted in FIG. 8. In embodiments, user device 212 and/or electronic application 214 may store some or all of data structure 800.

In embodiments, each field is associated with a particular type of information. As shown in FIG. 8, a relationship between information is shown with an "X." For example, a relationship between Info 1 exists with both Info 2 and Info 3. Also, a relationship is shown between Info 3 and Info 4. In embodiments, the "X" may indicate a parent-child relationship. For example, field 810 is a parent to field 804 which is a child. Also, for example, field 814 is parent to field 808 which is a child. In embodiments, each column is shown as child while each row is a parent.

Figure 9:
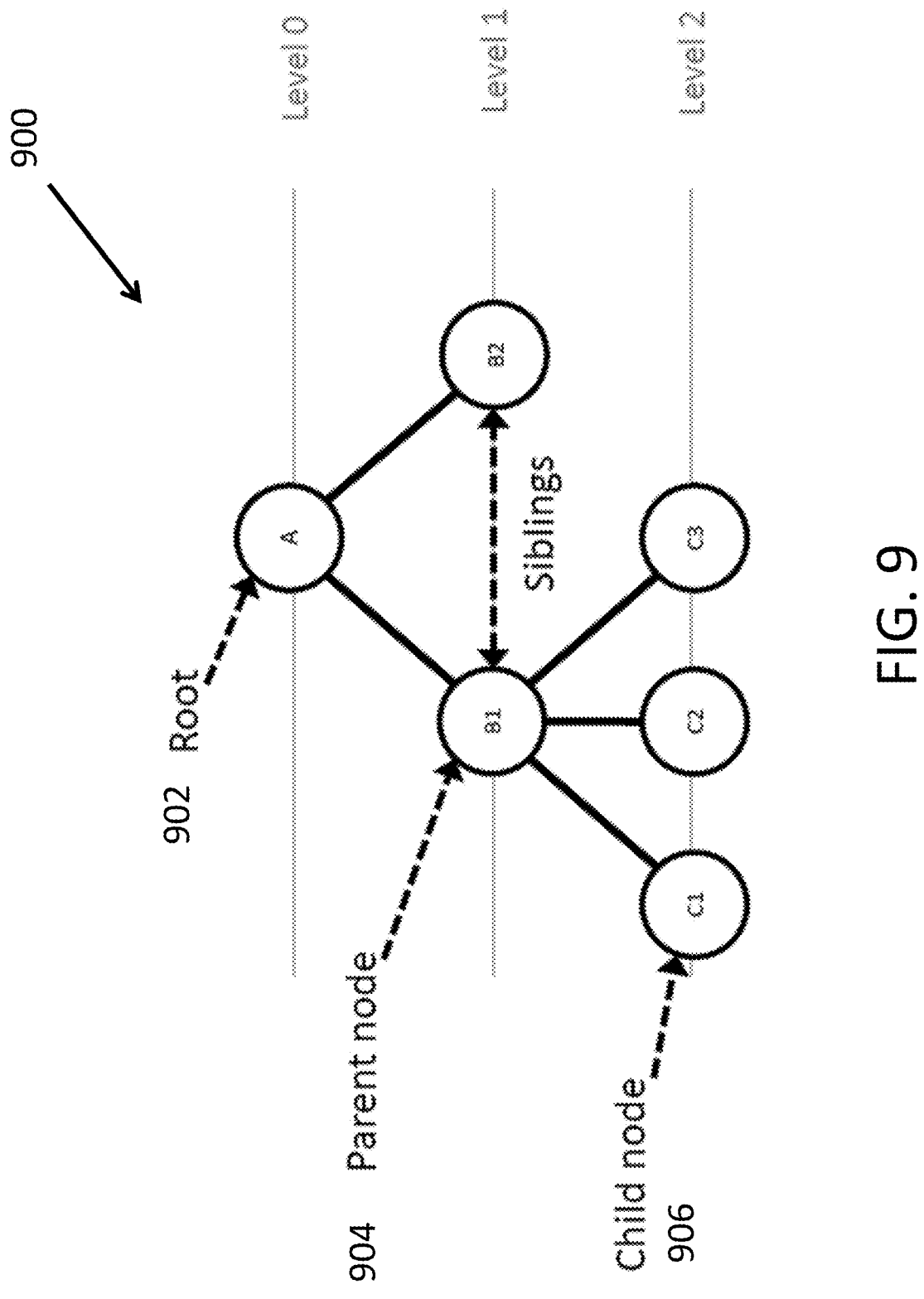
FIGS. 9 and 10 are examples of relationships with different types of information.

FIG. 9 is an example hierarchical relationship 900 that shows relationships between different nodes with each node associated with information. As shown in FIG. 9, root 902 may indicate the first area of information that is displayed. As shown in FIG. 9, root 902 may have two nodes B1 and B2 which are parent nodes 904 for their child nodes. Also, parent nodes 904 would be considered as child nodes in their relationship to root 902. As shown in FIG. 9, B1 has three child nodes 906 (nodes C1, C2, and C3). In embodiments, each node is associated with information. Also, FIG. 9 shows levels 0, 1, and 2 with each level associated with a layer in a three-dimensional system. Each level describes a layer which is further described in FIG. 13.

Figure 10:
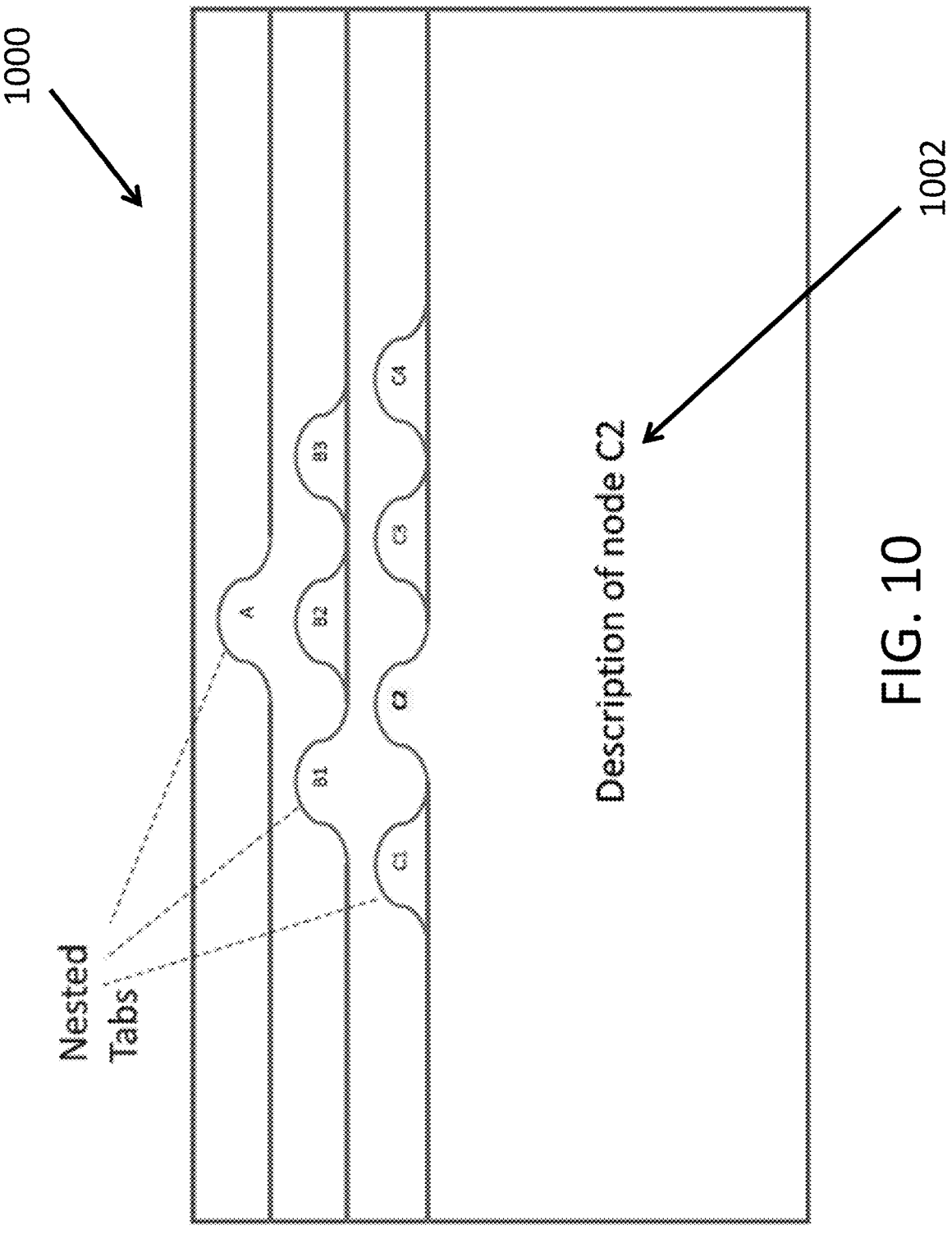

FIG. 10 is an example representation of information in a hierarchical relationship using nested tabs. In embodiments, display 1000 may be shown on a computing device display and may be generated by electronic application 214. As shown in FIG. 10, various nested tabs are shown such as A, B1, B2, B3, C1, C2, C3, and C4. In embodiments, a nested tab may have a relationship with one or more other nested tabs. As shown in FIG. 10, nested tab C2 has been selected and includes a description of C2. In embodiments, the description may be text, video, images, and/or any other type of information. In embodiments, display 1000 may be considered as a two-dimensional display. In embodiments, a command may be received to display information associated with a particular nested tab and, as a result, an area of information (such as described in FIGS. 1A-1C) may appear. In embodiments, an area of information may be a considered as a three-dimensional display.

Figure 11A:
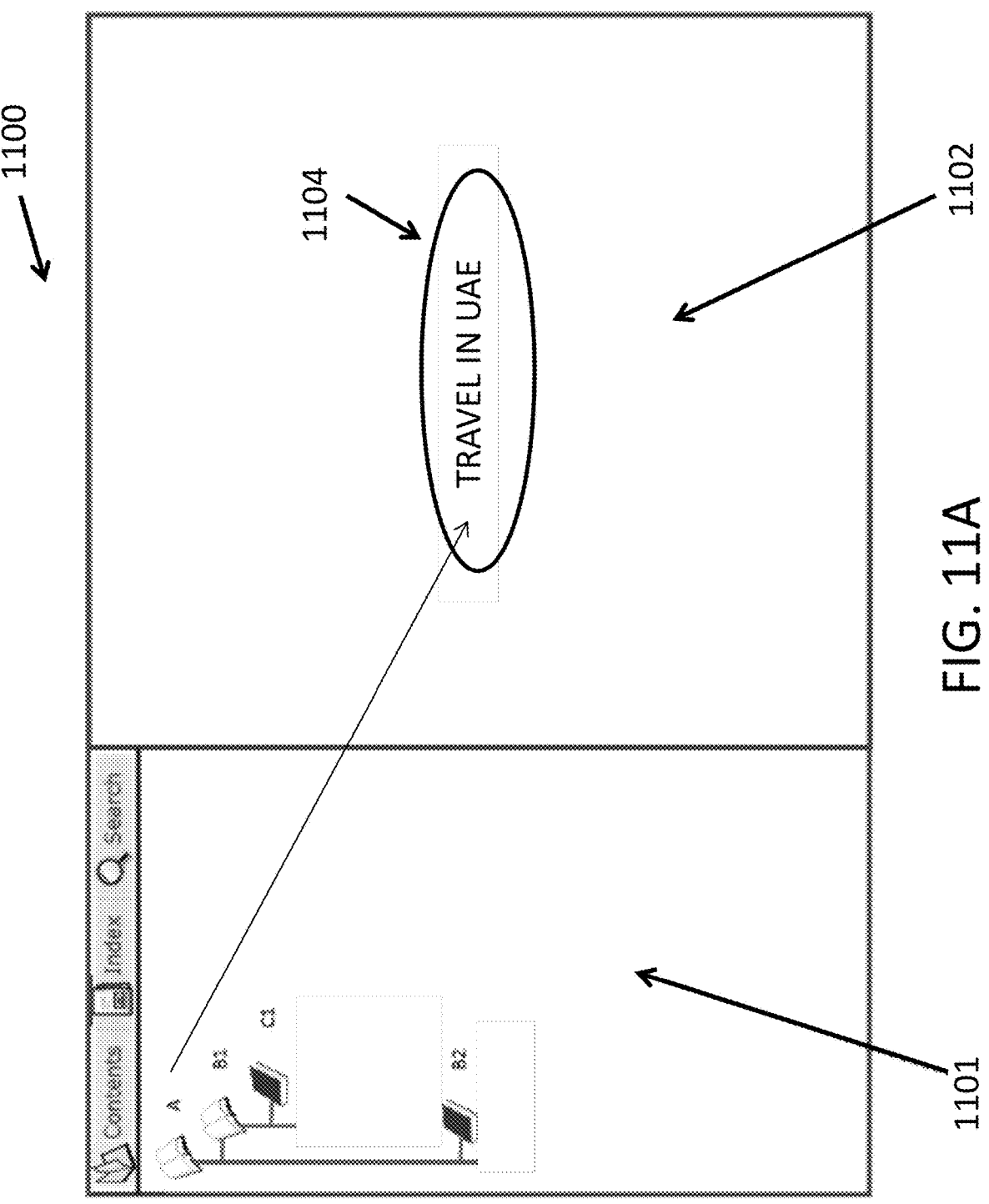
FIGS. 11A-11G, 12A-12D, and 13-15 are examples of generating information via user interfaces.

FIGS. 11A to 11F are examples of displaying and selecting electronic information via a user interface. In embodiments, the user interface may be associated with an electronic application, such as electronic application 214. As shown in FIG. 11A, display 1100 shows a menu that includes two display tiles, 1101 and 1102. As shown in tile 1101 (e.g., a sidebar) a listing of different nodes is shown (such as A, B1, C1, C2, etc.). In this example, a command (e.g., an electronic communication via a keypad, mouse, touching a touch screen, etc.) may be sent to select C2 which then shows an area 1104 within tile 1102. The area has a specified boundary and is given the title "Travel in UAE." In other examples, tile 1101 may only be displayed or tile 1102 may only be displayed. While FIG. 11A shows A, B1, C2, etc., the actual name of the area (such as "Travel in UAE") may instead appear in tile 1101.

Figure 11B:
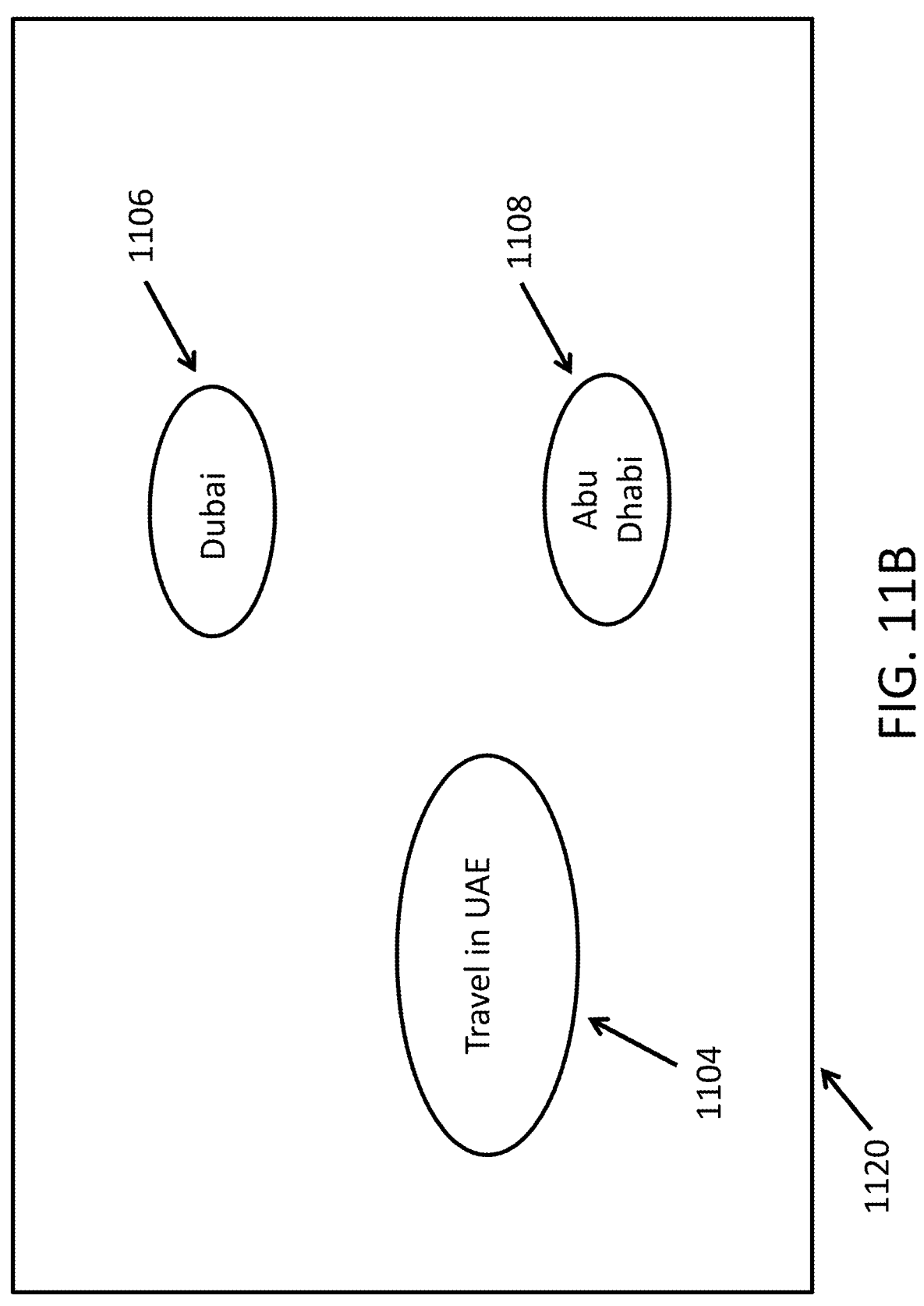

An additional electronic command may be received by the electronic application that selects area 1104. Upon selection of area 1104, display 1120 is generated, as shown in FIG. 11B, and displayed by the electronic application. As shown in FIG. 11B, area 1104 is displayed. In addition, child nodes related to area 1104 are also displayed. As shown in FIG. 11B, the areas for each child node are shown as areas 1106 and 1108.

Figure 11C:
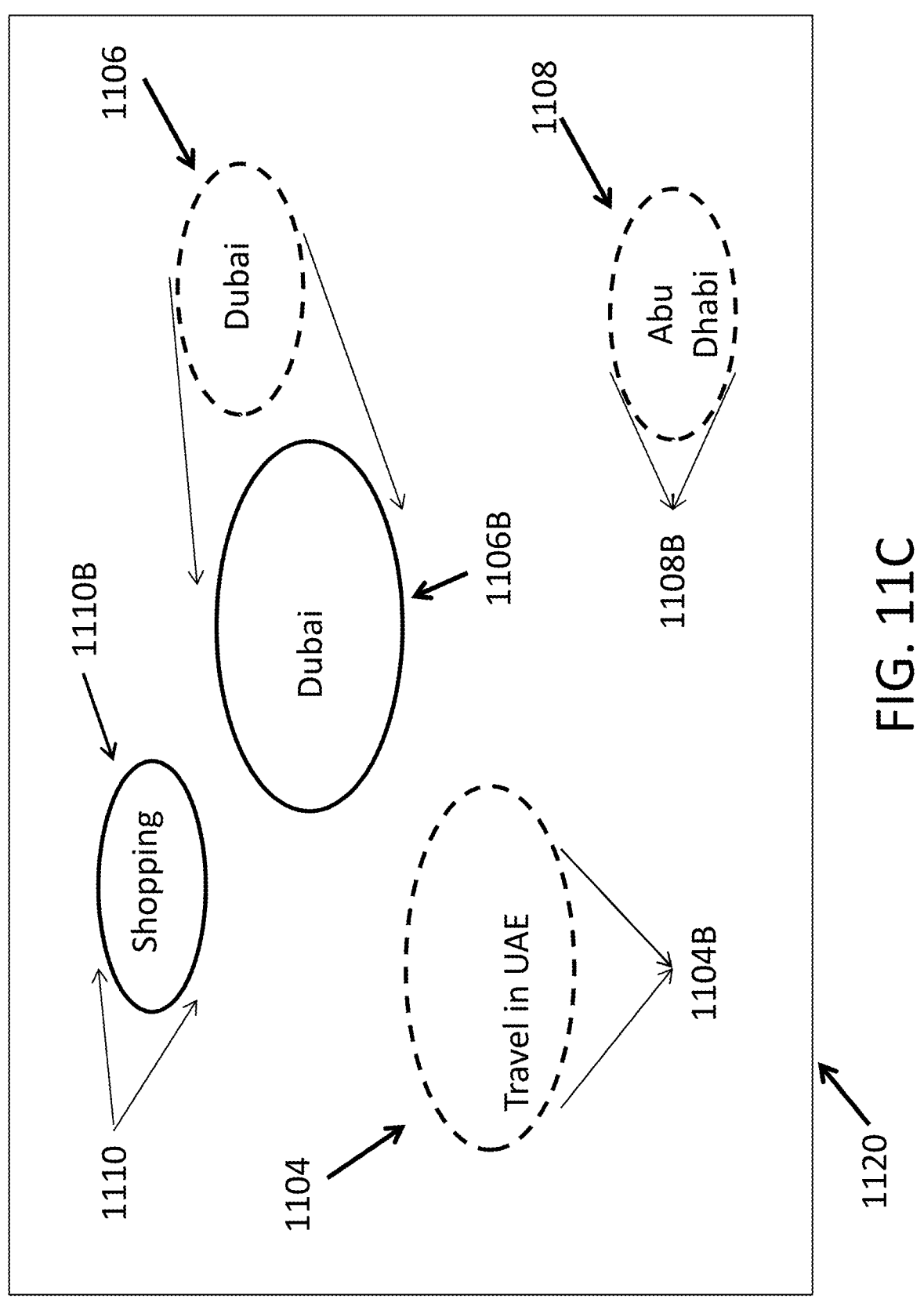

A user may wish to view information associated with area 1106. To do so, the user may select area 1106 (e.g., using a keypad, mouse, touching a touchscreen, etc.). Upon selection of area 1106, the size of area 1106 expands (as shown in FIG. 11C), areas 1104 and 1108 no longer are shown in display 1120 and area 1110B is now displayed. As shown in FIG. 11C, upon selection of area 1106, (1) from space 1110, area 1110B appears, (2) area 1104 decreases and disappears with only space 1104B, (3) and 1108 decreases and disappears with only space 1108B. The change in sizes of each area (increasing, appearing, or disappearing) may occur such that the changes appear to occur either gradually (gradual disappearance or appearance of areas) and/or instantaneously to a user viewing display 1120. In embodiments, the gradual appearance and disappearance may be controlled by user inputs (e.g., via an electronic mouse, touch screen, etc.) into electronic application 214.

Figure 11D:
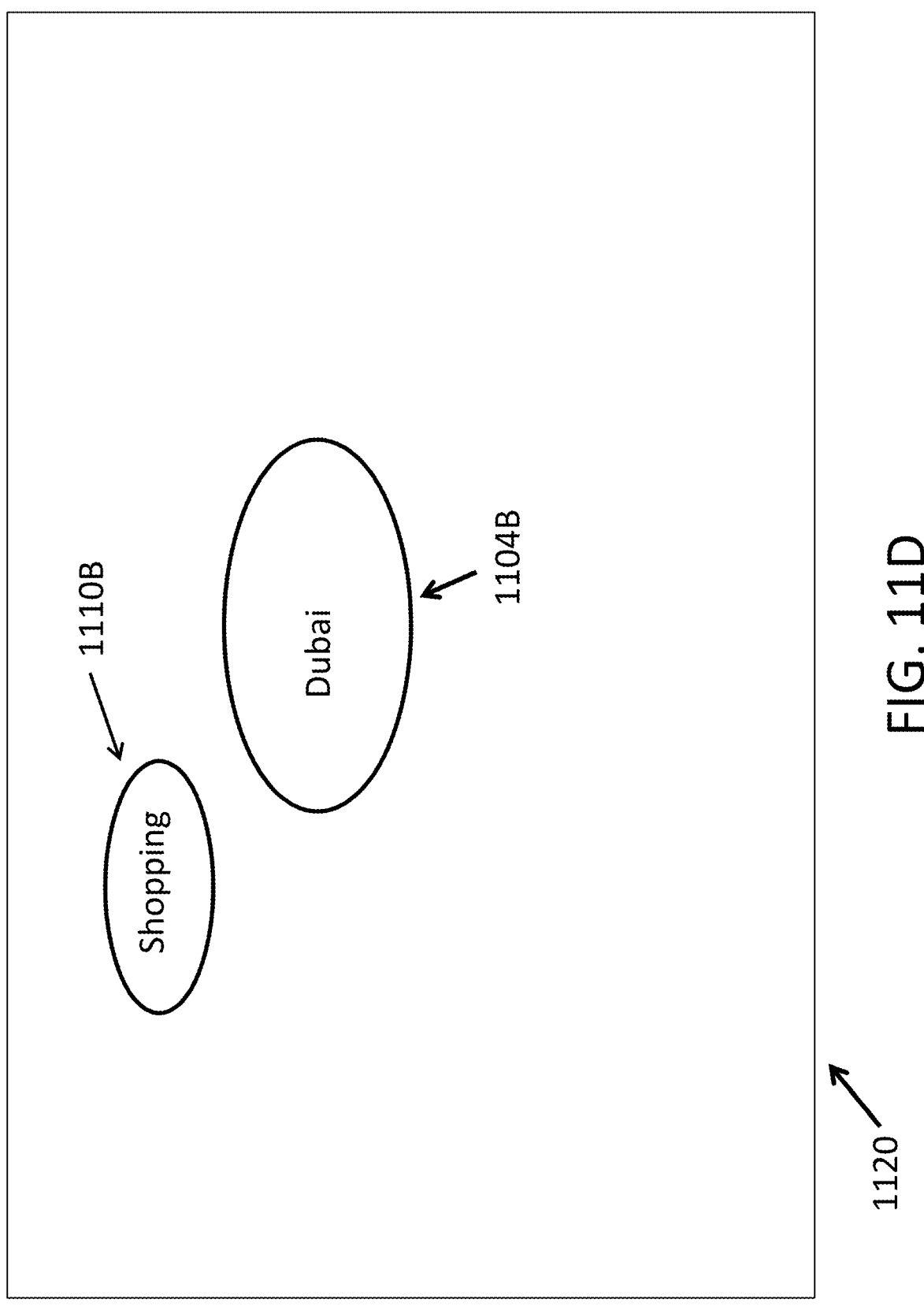
Figure 11E:
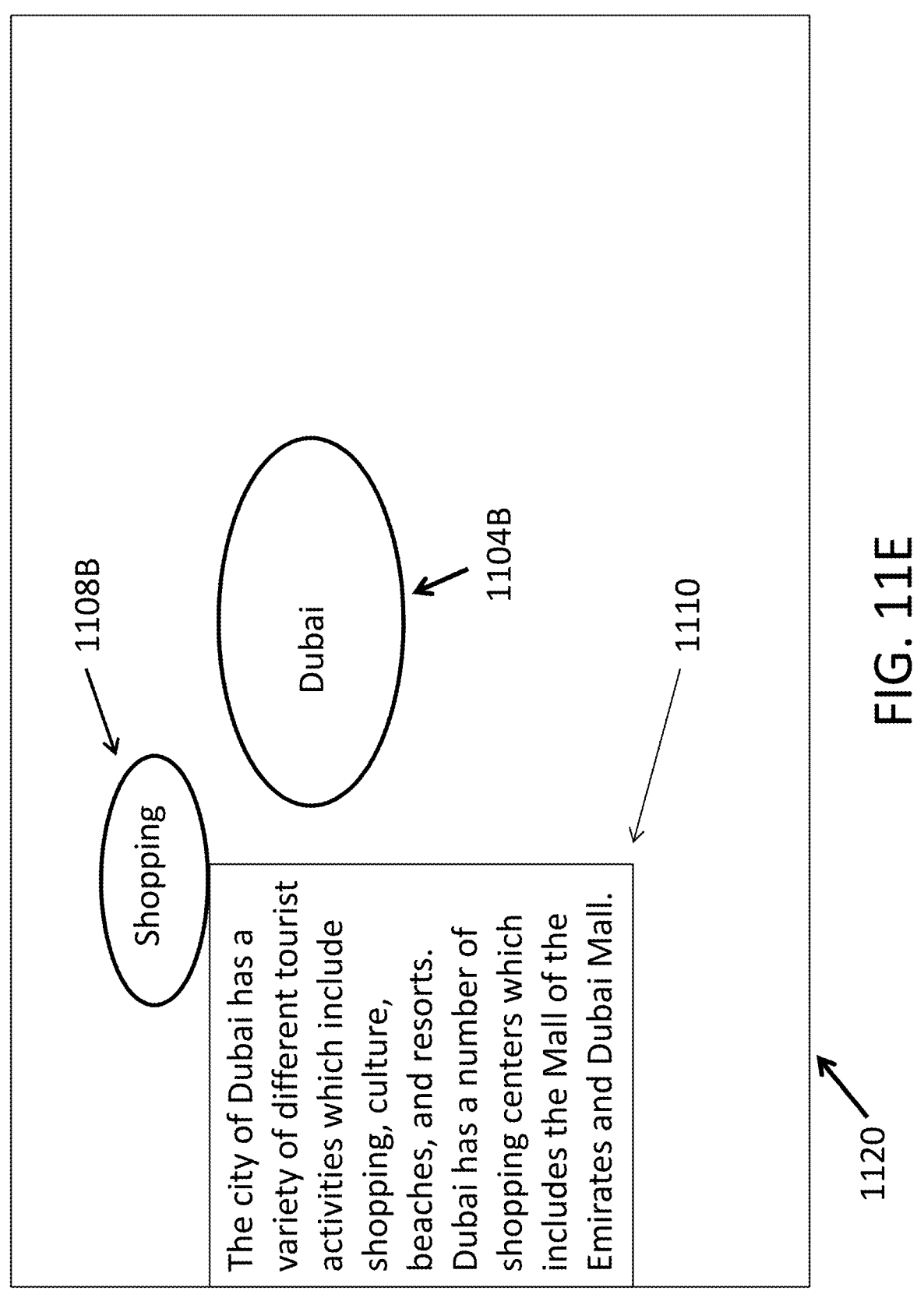

Once the changes have occurred, display 1120 may be shown as that described in FIG. 11D which shows areas 1104B and 1110B. At this point, the user may select area 1110B and send a command to the electronic application to show text within the section associated with area 1110B which is shopping in Dubai as area 1110B (shopping) is related to area 1104B (Dubai). As shown in FIG. 11E, text associated with area 1110B is displayed based on the user's command to the electronic application. The user may decide to edit the text as displayed in FIG. 11E. Upon sending a command to the electronic application, the user may be allowed to edit the text while area 1110B and area 1104B are still displayed.

Figure 11F:
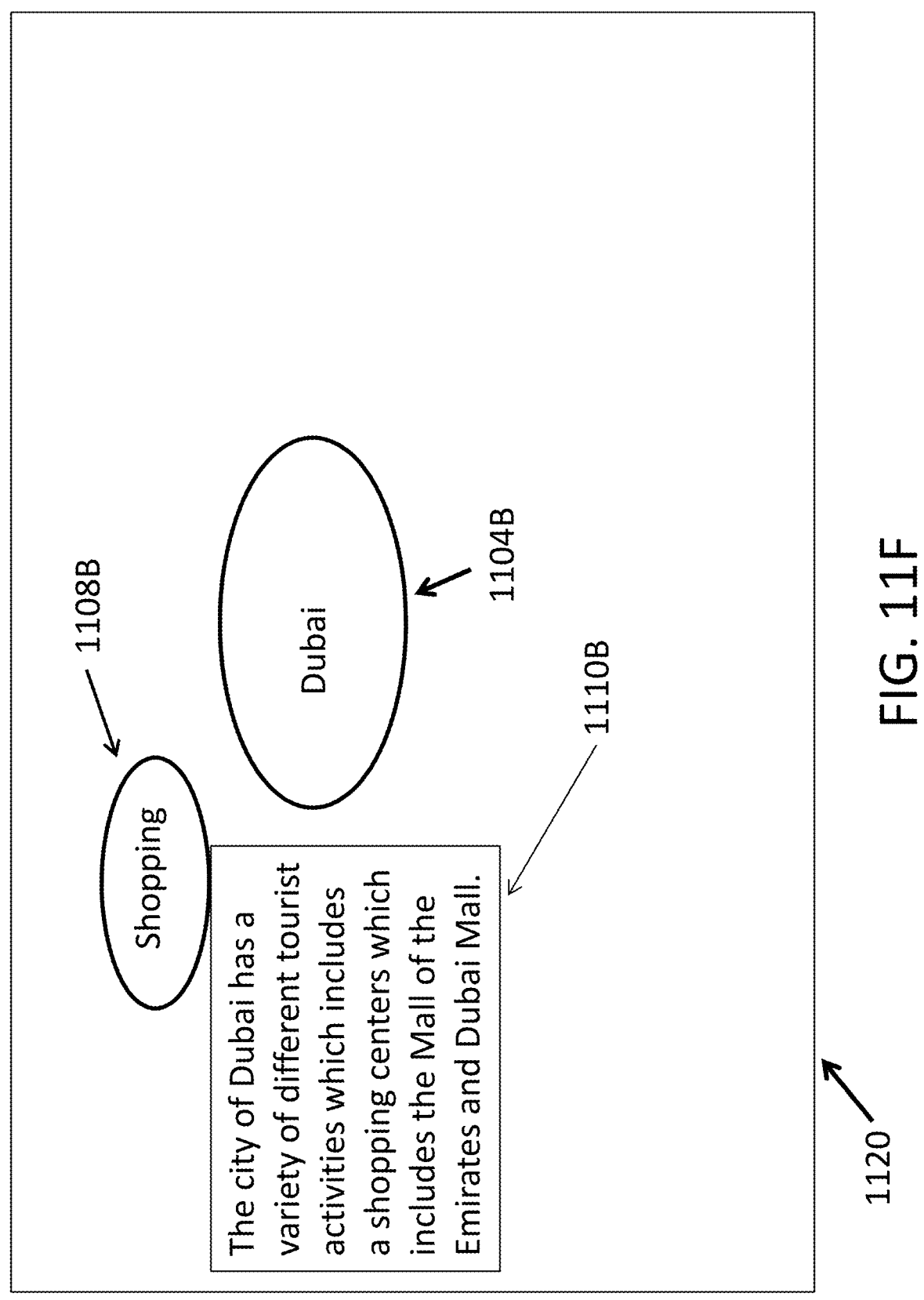
Figure 11G:
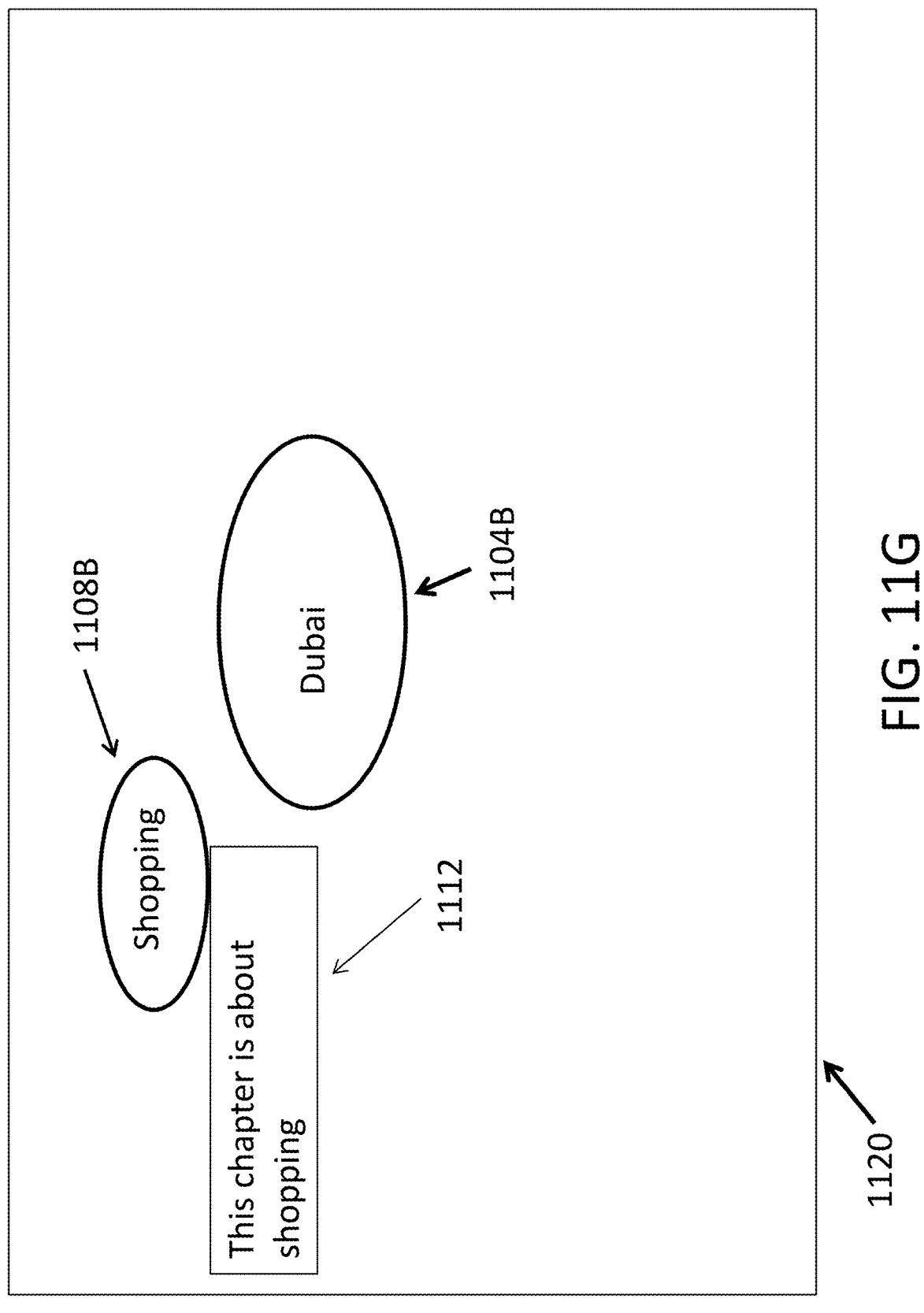

Upon editing the text, the edited text associated with area 1110B is shown in FIG. 11F. In addition, a user may wish to view a brief summary of area 1110B which can be done by sending a command to the electronic application. As shown in FIG. 11G, a brief summary of area 1110B is shown. The brief summary of area 1110B can be provided when a tab is selected by a user (e.g., right click, touching a particular area of the screen, etc.). Additional tabs may be associated with a particular area and can include different types of information for different tabs. For example, one tab may include illustrations, another tab may include a video, and another tab may include hyperlinks to web pages.

Figure 12A:
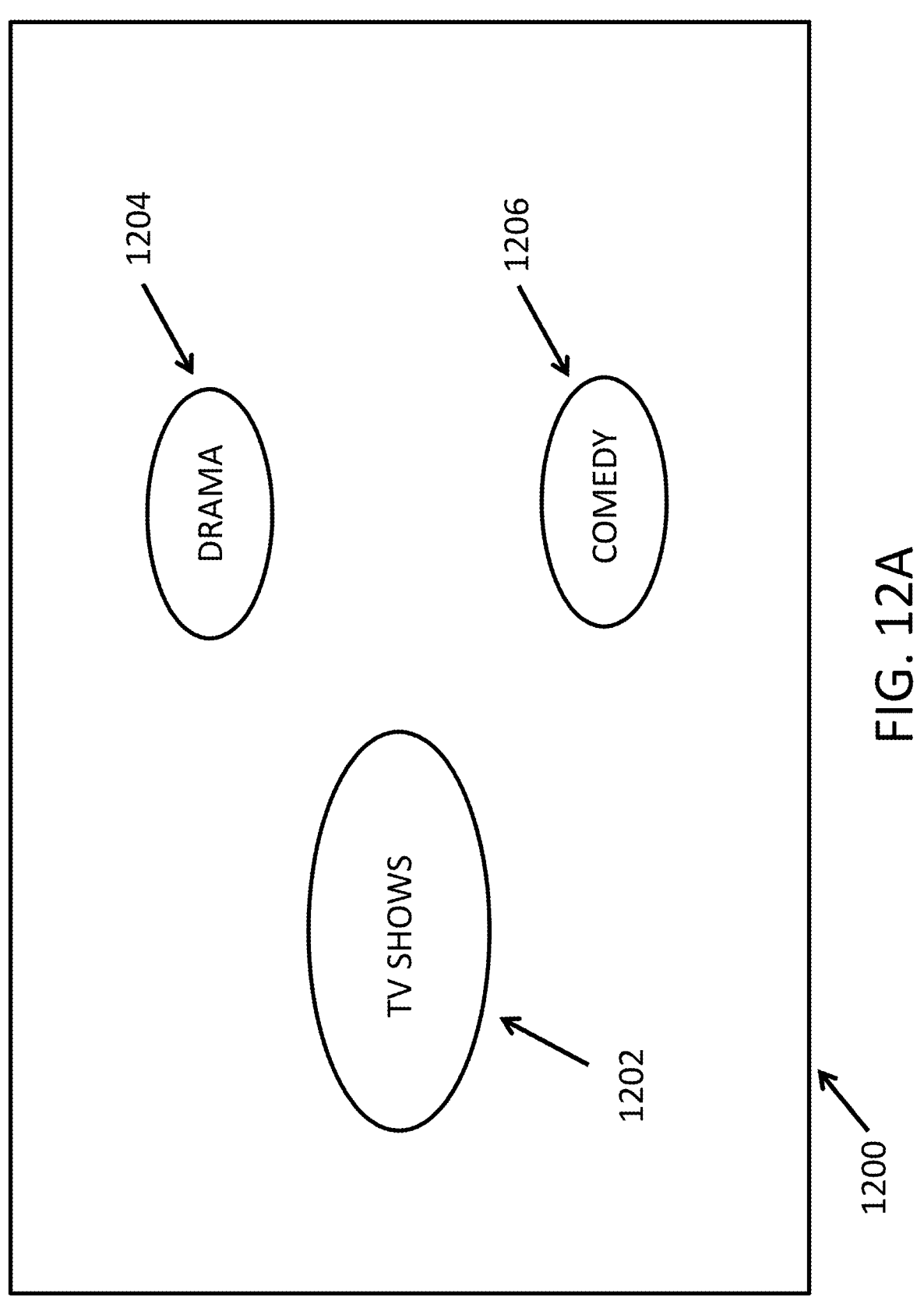
Figure 12B:
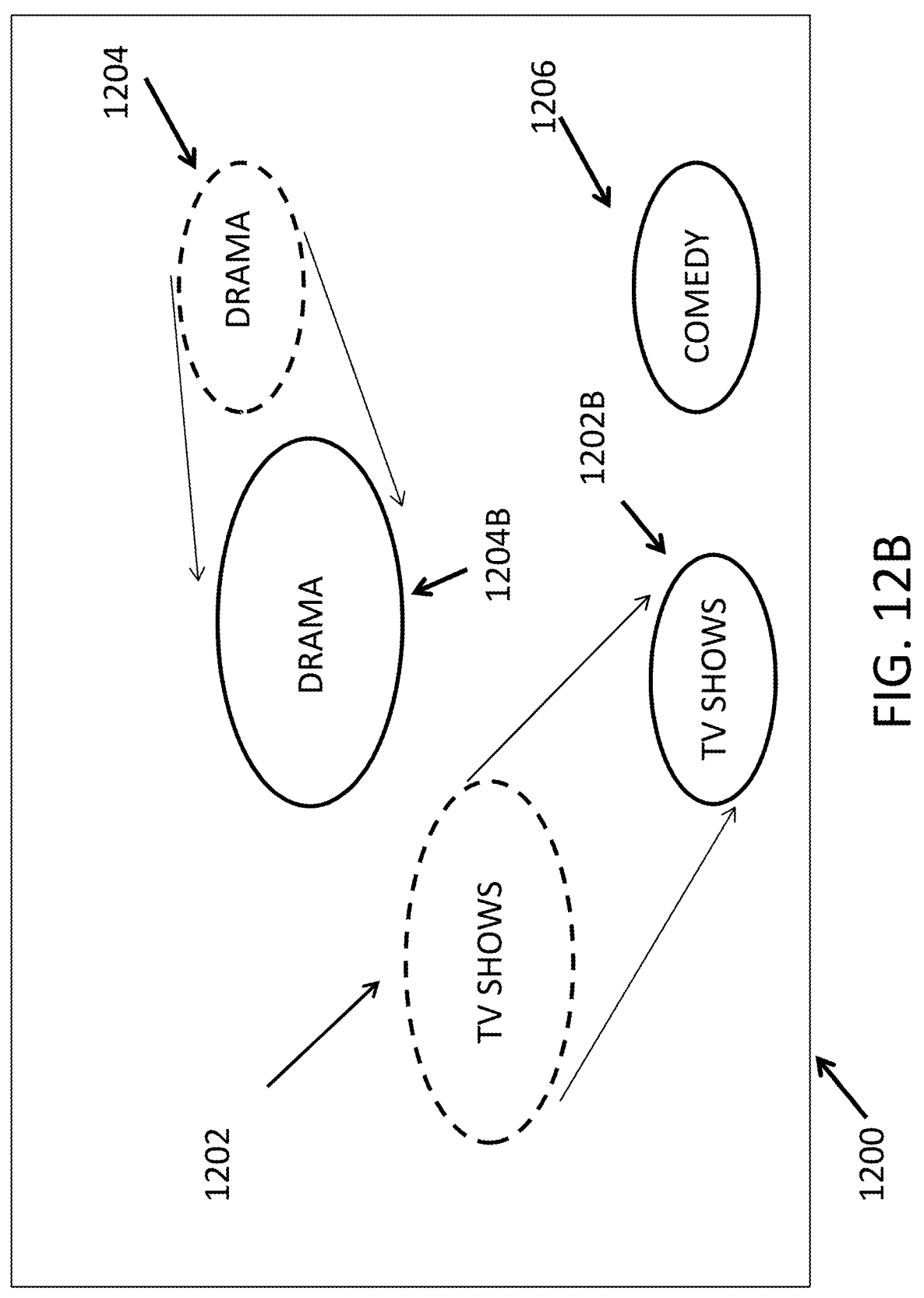
Figure 12C:
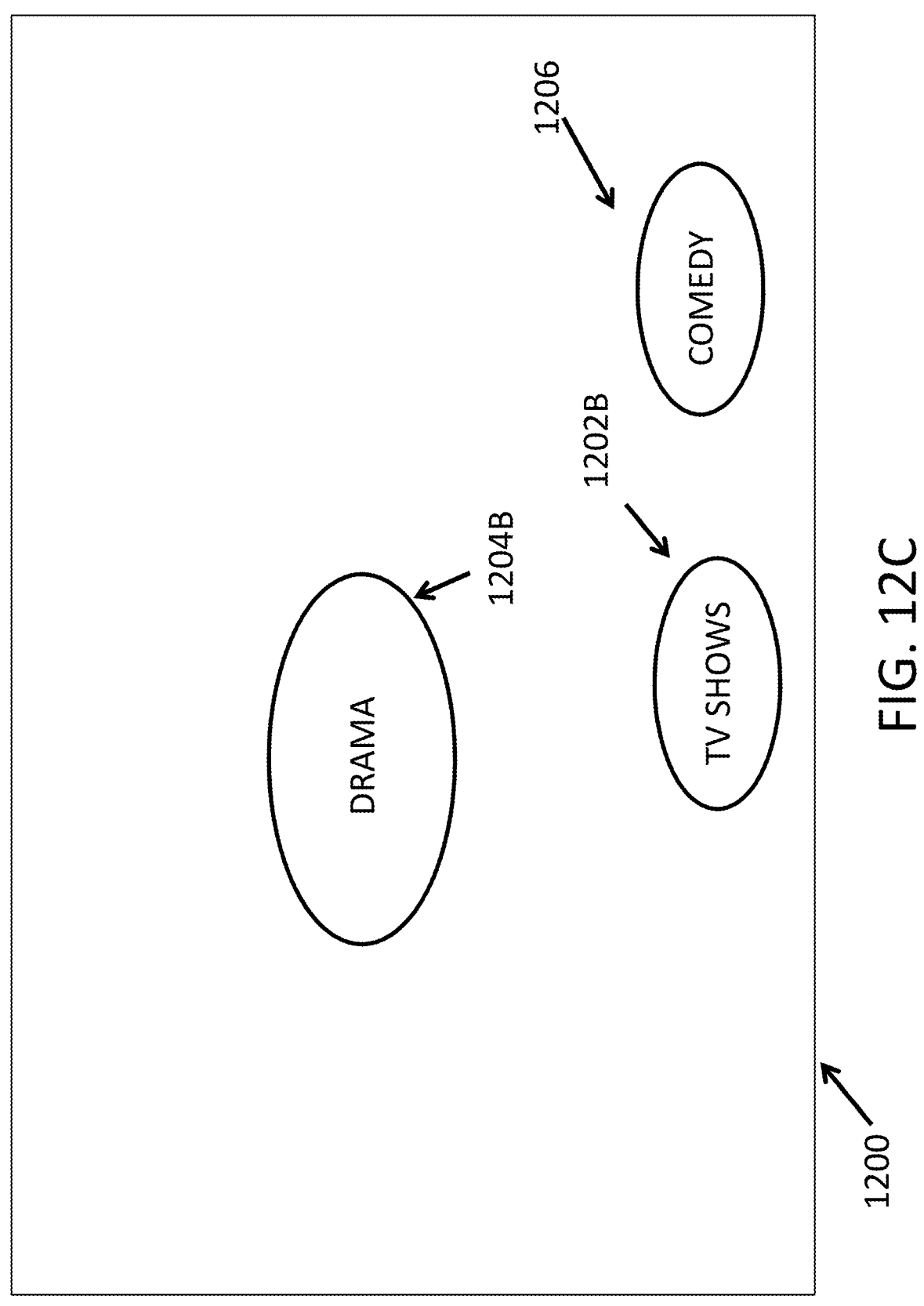

FIGS. 12A to 12C are examples of displaying areas of information. As shown in FIG. 12A, area 1202 is displayed on user interface display 1200. In addition, child nodes related to areas 1204 and 1206 are also displayed with each child node having its own child node. As shown in FIG. 12A, the areas for each child node are shown as areas 1204 and 1206. As shown in FIG. 12A, the center of the display is focused on area 1202 which is larger in size than areas 1204 and 1206. A user may wish to change the display to focus on a different area as the center of the display and having a larger size. In this example, the user may send electronic commands to have area 1204 as the center of display. In sending electronic commands/communications to a user device, an electronic application (e.g., electronic application 214) may change the display.

As shown in FIG. 12B, area 1204 may zoom and expand in an instantaneous fashion and appear as a larger area (area 1204B) and in the approximate center of the display. In addition, areas 1202 and 1206 may zoom and change size (decrease or increase) or remain the same size in a suitable way as to give the zoom in effect (1202B). Thus, as shown in FIG. 12C, area 1204B is at the center and is the largest area of the three displayed areas. Also, area 1202B is a reduced area. While the areas and locations have changed, the relationship between areas 1202B, 1204B, and 1206 is not changed and is the same as the relationship between 1202, 1204, and 1206. As such, area 1202B is still a parent node and areas 1204B and 1206 are child nodes associated with area 1202B. In this example, the parent and child nodes contain information that was obtained from search results off the worldwide web. The search results may have been electronically sent to the electronic application which automatically generated the relationship between the different areas.

Figure 12D:
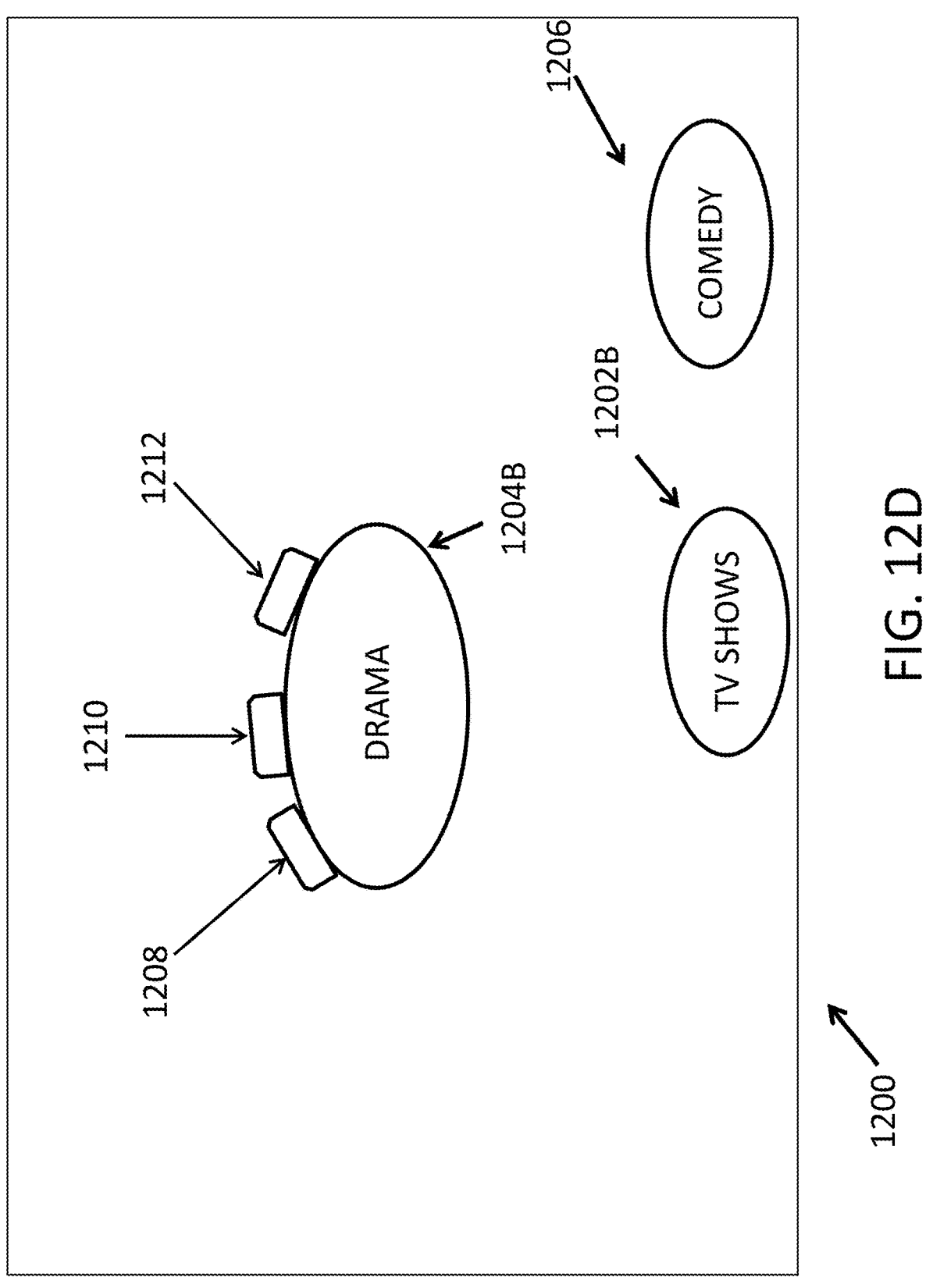

A user may further decide to select information associated with a particular area. In this non-limiting example, a user may decide to select information associated with area 1204B. By touching a particular area of the screen, a key input, a mouse selection, or any other electronic input, tabs may appear with that are associated with different types of information. As shown in FIG. 12D, there are tabs 1208, 1210, and 1212. For example, tab 1208 may be, when selected, bring up a pop-up screen or a new screen that includes drawings. Tab 1210 may include video information and Tab 1212 may include hyperlink information to web pages.

In embodiments, selection of one of the tabs may display different information to different user. For example, a first user who selects tab 1208 may display a first type of information (based on the first user's user name and/or password) and a second user who selects the same tab 1208 may result in displaying a second type of information. A third user selects tab 1208 and no information may be displayed. Furthermore, a user may add comments into one or more of the tabs. In addition, different users may be given different editing control over content in one or more of the tabs. For example, a first user may be able to edit (change content) in any of the tabs while a second user may be able to edit select tabs. A third user may not be able to edit any of the tabs. The editing capability (as well as determining the type of content viewable by a particular user) is associated with a user's login name which is assigned a particular access and editing status. In addition, different users may on different computing device, make simultaneous editing and/or providing comments within a particular tab.

For FIGS. 1A-1C, 11A-11G and 12A-12D, the process of zooming out (where an area appears from an empty space) or zooming in (where an area disappears and is replaced with an empty space), can be accomplished by using either a three-dimensional system or a two-dimensional system.

In embodiments, in a three-dimensional system, all the areas (associated with different nodes) have been pre-defined locations within a general template. In embodiments, when a user selects a particular area, electronic application 214 may zoom to another location associated with that particular area which may not be visible to the human eye but is electronically present in that particular location. In embodiments, when electronic application 214 zooms to that selected area (and its location), the related child areas (i.e., nodes) for the selected area will also become visible. When the user selects one of the child related areas, electronic application 214 will conduct, simultaneously, moving (i.e., pan) and zooming so that the selected child area becomes bigger in size and its children nodes also appear. At the same time, the previously selected area may no longer appears on the display since electronic application 214 has panned over to the selected child node and its children nodes.

Figure 13:
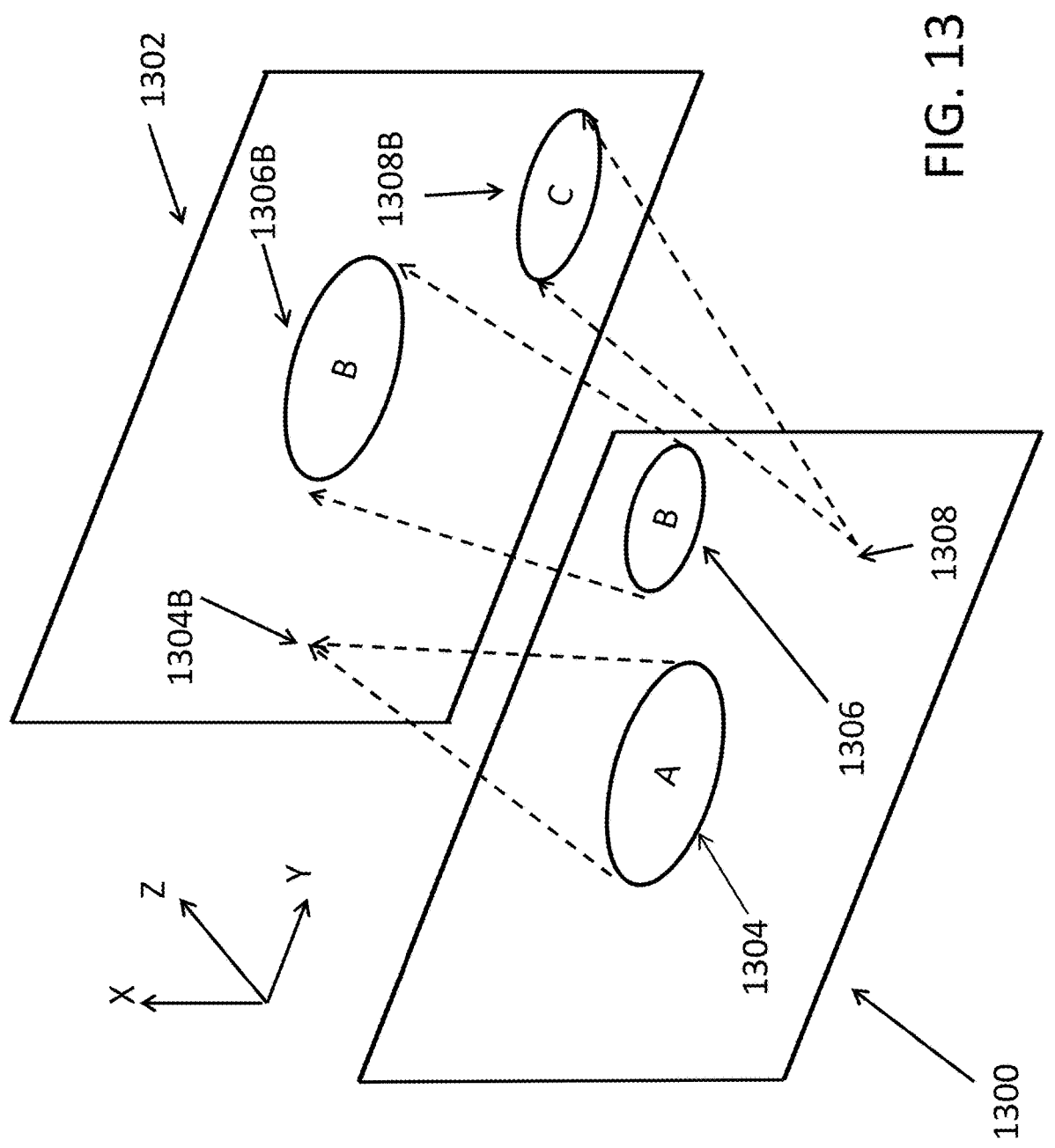

In other embodiments different node (and area) relationships may also be pre-defined across different layers that have a z-relationship in an x-y-z three dimensional system. As shown in FIG. 13, each layer exists in an x-y layer and each layer relates to another layer in a z-layer. In embodiments, one layer may be displayed on a computing device screen; however multiple layers may be shown together on a computing device screen (e.g., FIG. 11A with tiles 1101 and 1102 which may both be types of layers). In embodiments, layer 1300 may be displayed on a display screen (e.g., of a computing device). As shown, layer 1300 includes area 1304 and 1306. In a non-limiting example, a user may select area 1306 (e.g., via a mouse, touching area 1306 on a touch screen, etc.). Upon selecting area 1306, electronic application 214 may switch from layer 1300 to layer 1302. In doing so, particular areas may disappear (based on zooming in), such as area 1304, which are no longer shown in layer 1302. Instead space 1304B is shown on layer 1302. Other areas, such as area 1306 (which was selected) may increase in size as that area is now a parent node in layer 1302. In addition, space 1308 in layer 1300 transforms into area 1308B in layer 1302. Area 1308B is a child node of selected area 1306B (being a larger area size version of area 1306). Thus, electronic application 214 conducts zooming features by increasing or decreasing area sizes (such as diminishing into space) by changing layers (layer 1300 to 1302) when one area is selected. Also, electronic application 214 may simultaneously conduct a panning feature as changing from one layer to another layer results in panning (moving in the x-y axial relationship).

In embodiments, a user may go from layer 1302 to layer 1300 based on user inputs received by electronic application 214. For example, a user may right-click on a mouse or select a particular icon on the screen that sends a user from layer 1302 to layer 1300.

In embodiments, the change in area sizes and appearance of new areas that occur from FIGS. 1A to 1B may occur since each figure is associated with a different layer. In embodiments, one or more layers may appear on a computing screen based on user selection. Thus, in FIG. 1A, when a user selects area 104, a new layer appears which shows area 104 larger and also related areas (child nodes) in the new layer. Also, for example, FIGS. 11A to 11B to 11C may occur based on movement between different layers. Thus, for example, FIG. 11A may be one layer, FIG. 11B may show the transfer from one layer to another layer, and FIG. 11C may show the other layer.

Furthermore, when a user views a display screen, the layers are viewable in a two-dimensional view. If a user select area 1306B, then electronic application 214 increases the size of area 1306B and the children of 1306B now appear on the display screen since electronic application 214 has moved in the z-axis and layer 1302 becomes visible to the user (even though the layer already exists) since electronic application 214 has zoomed into (moved in the z-layer) layer 1302. If the user were to select 1308B, another layer further down on the z-axis may appear to the user and layer 1300 may no longer be visible to the user In embodiments, each layer has various areas that may have hierarchical relationships within layers and/or between layers.

While FIG. 13 shows rectangular layers that exist only in x-y at different z position, in other embodiments, layers may be square, round, irregular, or any other shape. In other implementations, layers may be of any three-dimensional shape (e.g., spherical, cuboid, etc.) that exists in all of the x-y-z planes. Also layers can have their position in the x-y axis changed to another position (i.e., panning). Also, while FIG. 13 indicates that only layer at a given time, a user may be able to see both layers when using a mouse (or other input feature) to move between layers. Thus, a smooth transition may occur between layers.

Figure 14:
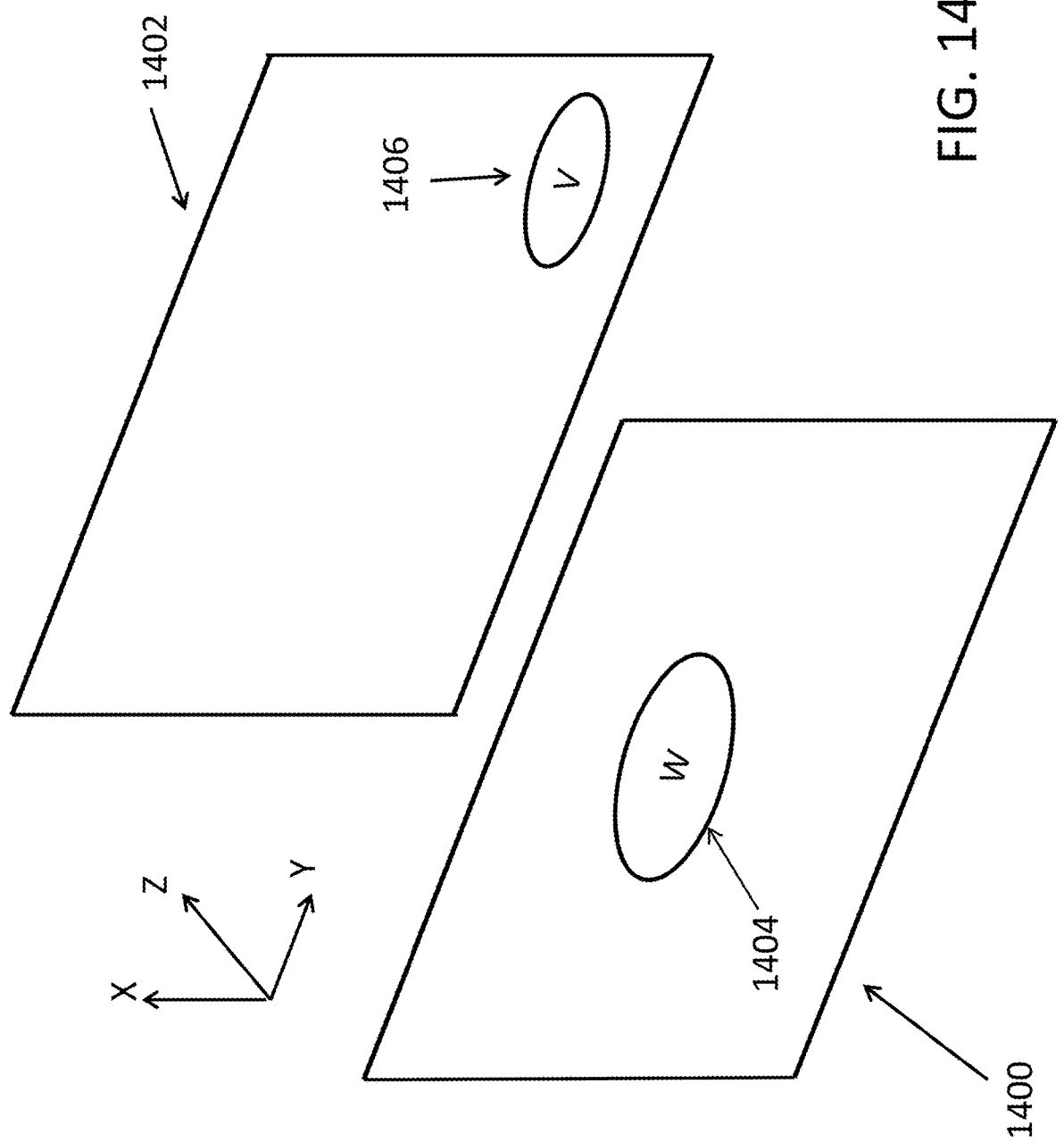

FIG. 14 shows another example three-dimensional system that shows different layers that display different areas that have a relationship with each other. As shown in FIG. 14, there are two layers where each layer exists in different points in the z-axis. In FIG. 14, there is layer 1400 and 1402. In this example, layer 1400 only shows a first level of layer at a particular distance on the z-axis. Layer 1402 shows a second level of layer at another distance on the z-axis. In FIG. 14, there may be other layers (not shown) that have the same position in the x-axis and have the same hierarchical position. Thus, electronic application 214 may pan to those other layers which have the same hierarchical position. Furthermore, layer 1402 and other layers (not shown) have another position in the x-axis and having the same hierarchical position. In this example, layer 1402 may have an area 1406 that is a child to area 1404 in layer 1400.

Additionally, layer 1400 and 1402 are at different levels (i.e., different positions on the z-axis) and each level creates a hierarchical relationship between area 1404 and 1406. For example, area 1404 may be similar to A in FIG. 9 and area 1406 may be similar to B1 in FIG. 9, with A and B1 having a hierarchical relationship (and thus area 1404 and area 1406 having a similar hierarchical relationship).

While FIG. 14 shows rectangular layers that exist only in x-y at different z position, in other embodiments, layers may be square, round, irregular, or any other shape. In other implementations, layers may be of any three-dimensional shape (e.g., spherical, cuboid, etc.) that exists in all of the x-y-z planes. Also, while FIG. 14 indicates that only layer at a given time, a user may be able to see both layers when using a mouse (or other input feature) to move between layers. Thus, a smooth transition may occur between layers.

Figure 15:
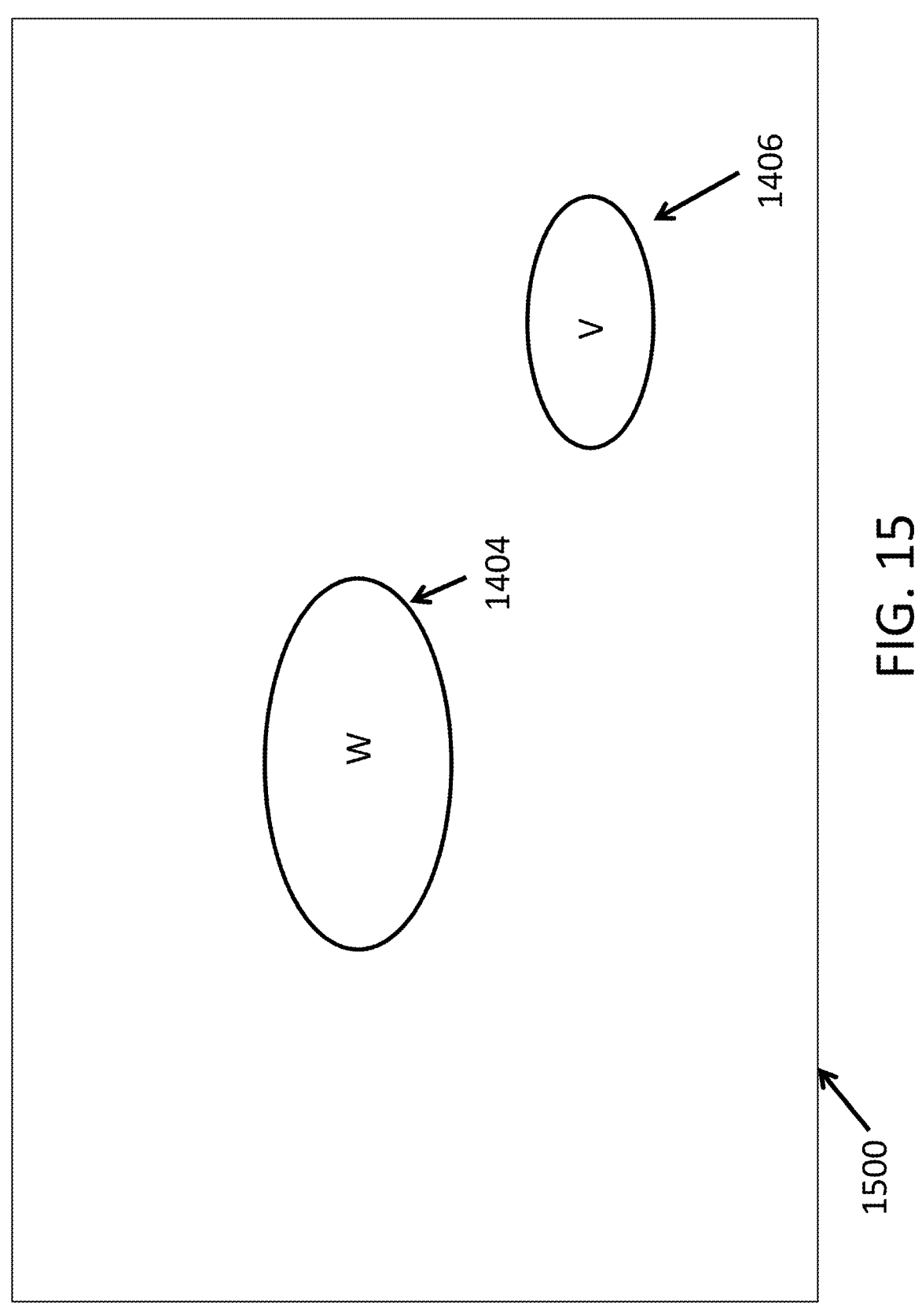

As shown in FIG. 15, when a user views display screen 1500 (e.g., on a computing device), the areas described in FIG. 14, the user will see area 1404 and 1406 as if there are on the same plane. In embodiments, if a user pans around the screen, the user could position area 1404 in front of area 1406 since the two layers are in different planes. Thus, the user is moving layer 1400 around the x-y axis which results in positioning area 1404 in front of area 1406. Furthermore, if the user selects area 1406, then child nodes (grandchild nodes of area 1404) may be begin to appear as visible on display screen 1500. These child nodes of area 1406 are located in another layer with a different position on the z-axis. The child nodes of area 1406 may be displayed with gradually increasing size of the child nodes of area 1406 along with the child nodes of 1406 gradually zoom into visibility on display screen 1500. At the same time, area 1404 may gradually disappear as electronic application 214 moves along the z-axis.

FIGS. 11B to 11D may use similar layers within the three-dimensional system described in FIGS. 14 and 15. For example, FIG. 11B may have area 1104 on one layer (at a first z-positon on a z-axis) and areas 1106 and 1108 (which are both child areas and have the same hierarchical relationship with area 1104) are one layer at another point in the z-axis. However, a user, when viewing display 1120, will view the two layers as on two-dimensional layer. If the user selects area 1106, then electronic application 214 begins to zoom between layers such that area 1104 appears to disappear into space 1104B and area 1108 disappears into area 1108B, as shown in FIG. 11C. This disappearance of areas is the result of an electronic movement (by electronic application 214) that is moving between layers as well as panning (automatically and simultaneously with zooming) which allows for the user to no longer view areas 1104 and 1108. In this non-limiting example, the user views area 1106B (which is a zoomed in version of area 1106 and not another separate area) as electronic application 214 has zoomed and panned onto area 1106 within that layer.

Furthermore, area 1110 ("Shopping") appears since electronic application 214 has moved along the z-axis and now the layer with area 1110 is now visible on display 1120 to the user. However, the user is seeing a gradual (or instantaneous) visibility of area 1110 on display 112. If the user were to select area 1110, then child nodes of area 1110 may begin to gradually appear and eventually appear as electronic application 214 move gradually along the z-axis. Thus, area 1106B would gradually disappear as electronic application 214 has moved from that position on the z-axis. The gradual appearance and disappearance may be controlled by user inputs (e.g., via an electronic mouse, touch screen, etc.) into electronic application 214. Thus, a user may be view two or more layers on display 1120.

In embodiments, in a two-dimensional system, when a user selects a particular area, electronic application 214 may pan (i.e., move) to that particular area. Once electronic application 214 pans to that particular area, the child areas (nodes) for that particular area may appear and other areas may disappear. In the two-dimensional system, there may not be multiple layers and the change of areas on a computing screen may be based on movement in an x-y relationship. For example, the change of figures from FIG. 1A to 1B may be based on changes that occur in a two-dimensional system whereby the changes are moving within one or more superimposed 2D layers.

In alternate embodiments, different areas may be electronically generated and displayed based on stored areas in electronic libraries that store both the areas and relationships. In embodiments, selection of a particular area by a user on a display screen may send electronic communications to electronic application 214 which may generate particular area for display and/or remove other areas being displayed based on the relationship stored by the electronic libraries. In embodiments, the areas and relationships may be provided in an electronic library that is similar to the data structure 800 in FIG. 8. Thus, generating an area in a particular location may be based on information in one or more electronic libraries. Thus, no panning or zooming may occur and areas appear and/or disappear based on their stored relationships. For example, FIGS. 1A to 1B the display is fixed and areas appear and/or disappear in that display without any panning or zooming.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 2. Also it will be understood that any of the various actions can result in any type of electronic information to be displayed in real-time and/or simultaneously on multiple user devices (e.g., similar to user device 212). For FIGS. 4, 5, 6, and 7, the order of the blocks may be modified in other implementations. Further, non-dependent blocks may be performed in parallel. Also, it will be understood that any electronic post may include information about services and other information that may include user-generated and non-user generated text, numbers, photos, animation, multimedia content, and/or any other type of electronic content that can be analyzed for any of the reasons described in the above figures.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise. Also, the phrase "converted text," or "converted information" may indicate information that has been converted from handwritten or non-handwritten information to printed information. The phrase "information" may indicate letters, words, numbers, and/or symbols. The phrase "text" may indicate letters, numbers, and/or symbols. The phrases "information" and "text" may indicate the same thing, i.e., letters, numbers, and/or symbols.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:
a memory;
a processor, connected to the memory, to:
receive electronic information;
analyze the electronic information;
display, based on analyzing the electronic information, the electronic information on a graphical user interface,
where:
the displayed electronic information is shown as a first electronic formation, where the first electronic formation is located on a first electronic layer that is displayed and is visible on the graphical user interface, and where additional electronic information is within a second electronic formation, where:

the second electronic formation is on a second electronic layer, where:
the second electronic formation is not visible on the graphical user interface, and
the first electronic formation is electronically related to the second electronic formation in a hierarchical relationship;
receive an electronic communication, based on selection of the first electronic formation;
change the display on the graphical user interface, where:
the changed display is visibly displaying the second electronic formation, where:
the first electronic layer and the second electronic layer both electronically move within an x-y-z electronic three-dimensional space,
the second electronic layer is electronically located at a particular distance on the z-axis of the x-y-z electronic three-dimensional space,
the second electronic layer visibly displays the second electronic formation and the first electronic formation is not visible on the second electronic layer, where:
the change in the display of the second electronic formation and the non-display of the first electronic formation occurs simultaneously, and
the x-y-z electronic three-dimensional space is displayed as an electronic x-y two-dimensional space, and
the first electronic layer and the second electronic layer results in displaying greater amounts of electronic information and reducing computer processing time and resources, and wherein during the change of the display:
a first x-y coordinate of the first electronic formation's x-y-z location does not change but a first z coordinate of the first electronic formation's x-y-z location of the first electronic formation changes,
a second x-y coordinate of the second electronic formation's x-y-z location does not change but a second z coordinate of the second electronic formation's x-y-z location of the second electronic formation changes.

2. The device of claim 1, where the additional electronic information is not displayed within the first electronic formation.

3. The device of claim 1, where the second electronic formation is a first node and the second electronic formation is a second node, where the first node is related to the second node within the hierarchical relationship.

4. The device of claim 3, where the first node is a parent node and the second node is a child node.

5. The device of claim 4, where the relationship of the first node and the second node permits the relationship of the first electronic layer and the second electronic layer within the x-y-z electronic three-dimensional space.

6. A method, comprising:
receiving, by a computing device, electronic information;
analyzing, by the computing device, the electronic information
displaying, by the computing device, based on analyzing the electronic information, a first electronic formation where:
the first electronic formation is located on a first electronic layer that is displayed and is visible on the graphical user interface, and a second electronic formation is located on a second layer, where:

the second electronic formation is not visible on the graphical user interface, and the first electronic formation is electronically related to the second electronic formation in a hierarchical relationship;

receiving, by the computing device, an electronic communication, based on selection of the first electronic formation;

changing, by the computing device, the display on the graphical user interface, wherein during the change of the display:

a first x-y coordinate of the first electronic formation's x-y-z location does not change but a first z coordinate of the first electronic formation's x-y-z location of the first electronic formation changes, a second x-y coordinate of the second electronic formation's x-y-z location does not change but a second z coordinate of the second electronic formation's x-y-z location of the second electronic formation changes, and where:

the changed display is visually displaying the second electronic formation, where:

the second electronic layer is electronically located at a particular distance on a z-axis of an x-y-z three-dimensional space, and the first electronic formation is not visible on the second electronic layer, where:

the change in the display of the second electronic formation and the non-display of the first electronic formation occurs simultaneously, and the x-y-z three-dimensional space is displayed as an electronic x-y two-dimensional space.

7. The method of claim 6, where the first electronic formation and the second electronic formation are located at different electronic locations when displayed on the graphic user interface.

8. The method of claim 7, where the change from displaying the first electronic formation to the second electronic formation is instantaneous and the electronic movement from the first electronic layer to the second electronic layer, on the z-axis, occurs automatically.

9. The method of claim 8, where the first electronic formation and the second electronic formation are related to each other in a hierarchical relationship.

10. The method of claim 8, where the first electronic formation has a child relationship to the second electronic formation, and where the first electronic formation has a parent relationship to a third electronic formation.

11. The method of claim 8, where the first electronic formation is configured to be displayed as a first area shown on the first electronic layer and the first electronic formation is configured to be displayed as a second area shown on the second electronic layer.

12. The method of claim 11, further comprising:

displaying, by the computing device, a third electronic formation, where the third electronic formation is part of a third electronic layer, and where:

the first electronic formation, displayed as the first area, and the third electric formation, displayed as a third area, are displayed together even though the first electronic formation and the third electronic formation are on different electronic layers;

selecting, by the computing device, the third electronic formation, where the selecting the third electronic formation results in the third electronic layer electronically moving on the z-axis and increasing the third area's size.

13. The method of claim 12, where the movement of the first electronic layer on the z-axis and the second electronic layer on the z-axis results in the computing device results in visually panning the x-y-z electronic three-dimensional space displayed on the graphical user interface.

14. The method of claim 13, where the first area and the second area have a first spatial relationship displayed on the graphical user interface.

15. The method of claim 14, where the first spatial relationship is different than a second spatial relationship that is between the first area and the third area.

* * * * *